US010776746B2

(12) United States Patent
Stanarevic et al.

(10) Patent No.: US 10,776,746 B2
(45) Date of Patent: Sep. 15, 2020

(54) SYSTEMS AND METHODS FOR TRACING ITEMS

(71) Applicant: SICPA HOLDING SA, Prilly (CH)

(72) Inventors: Ognjen Stanarevic, Le Mont-sur-Lausanne (CH); Boris Pavlovic, Lausanne (CH); Bradley Cooper, Kambah (AU)

(73) Assignee: SICPA HOLDING SA, Prilly (CH)

( * ) Notice: Subject to any disclaimer, the term of this patent is extended or adjusted under 35 U.S.C. 154(b) by 401 days.

(21) Appl. No.: 15/121,571

(22) PCT Filed: Feb. 18, 2015

(86) PCT No.: PCT/EP2015/053384
§ 371 (c)(1),
(2) Date: Aug. 25, 2016

(87) PCT Pub. No.: WO2015/128232
PCT Pub. Date: Sep. 3, 2015

(65) Prior Publication Data
US 2016/0371644 A1 Dec. 22, 2016

(30) Foreign Application Priority Data

Feb. 26, 2014 (EP) .................................... 14156822

(51) Int. Cl.
*G06Q 10/08* (2012.01)
*G06F 16/2455* (2019.01)
*G06K 7/14* (2006.01)

(52) U.S. Cl.
CPC ... *G06Q 10/0833* (2013.01); *G06F 16/24564* (2019.01); *G06K 7/1417* (2013.01)

(58) Field of Classification Search
CPC ............. G06Q 10/063; G06Q 10/0832; G06Q 10/0835; G06Q 10/0836; G06Q 50/12;
(Continued)

(56) References Cited

U.S. PATENT DOCUMENTS 7,205,897 B2* 4/2007 Lin ........................ G06Q 10/00
235/375
7,673,464 B2* 3/2010 Bodin .................... G06Q 10/08
62/127
(Continued)

FOREIGN PATENT DOCUMENTS

CA         2671693         1/2010
JP      2002149472    *   8/2000 ............. G06F 12/00
(Continued)

OTHER PUBLICATIONS

"Fast Warehouse Management System (WMS) using RFID Based Goods Locator System," Trio Adiono, University Center of Excellence on Microelectronics Center. IEEE 6th Global Conference on Consumer Electronics. Oct. 24-27, 2017 (Year: 2017).*
(Continued)

*Primary Examiner* — George Chen
*Assistant Examiner* — Brian Adams Heflin
(74) *Attorney, Agent, or Firm* — Mung, Geissler, Olds & Lowe, P.C.

(57) ABSTRACT

A system for tracing a plurality of items considering an interface configured to receive an event data record including operation information indicating an operation, time information indicating a time when the operation occurred, and identification information identifying at least one item, a data store configured to store state information indicating one or more states for each one of the plurality of items, and a processing unit configured to receive via the interface one event data record. The processing unit is configured to, in response to receiving the event data record and for the at least one item identified by the identification information included in the received event data record, generate, based on the received event data record, state information indicating a state of the at least one item after the operation, query, from the data store, preceding state information indicating a
(Continued)

state of the at least one item directly before the operation, and succeeding state information indicating a state of the at least one item directly after the operation, evaluate, if preceding state information was retrieved in response to querying the data store, a transition between the state indicated by the generated state information and the state indicated by the preceding state information for a first rule conformity, and to, evaluate, if succeeding state information was retrieved in response to querying the data store, a transition between the state indicated by the generated state information and the state indicated by the succeeding state information for a second rule conformity.

16 Claims, 8 Drawing Sheets

(58) Field of Classification Search
CPC ............ G06Q 30/0625; G06Q 30/063; G06Q 30/0223; G06Q 10/06; G06Q 10/0833; G06Q 10/087; G06Q 30/00; G06Q 10/0633; G06Q 10/06315; G06Q 10/0639; G06Q 10/0637; G06Q 10/08; G06Q 10/083; G06F 17/30507
USPC .......................................................... 705/28
See application file for complete search history.

(56) References Cited

U.S. PATENT DOCUMENTS

| 7,685,561 | B2 | 3/2010 | Deem et al. |
| 9,691,114 | B2* | 6/2017 | Ashrafzadeh ....... G06F 19/3462 |
| 2003/0227392 | A1 | 12/2003 | Ebert et al. |
| 2011/0238429 | A1 | 9/2011 | Kawakita et al. |
| 2013/0124227 | A1 | 5/2013 | Ellis |
| 2015/0046229 | A1* | 2/2015 | Gollu .................. G06Q 10/083 705/7.39 |

FOREIGN PATENT DOCUMENTS

| RU | 2408061 | 12/2010 |
| RU | 2479033 | 4/2013 |
| WO | 2006094030 | 9/2006 |

OTHER PUBLICATIONS

Russian office action and Search Report in counterpart Russian Application No. 2016137343 dated Jan. 17, 2018 (and English language translation of Relevant Excerpt).

\* cited by examiner

Fig. 1
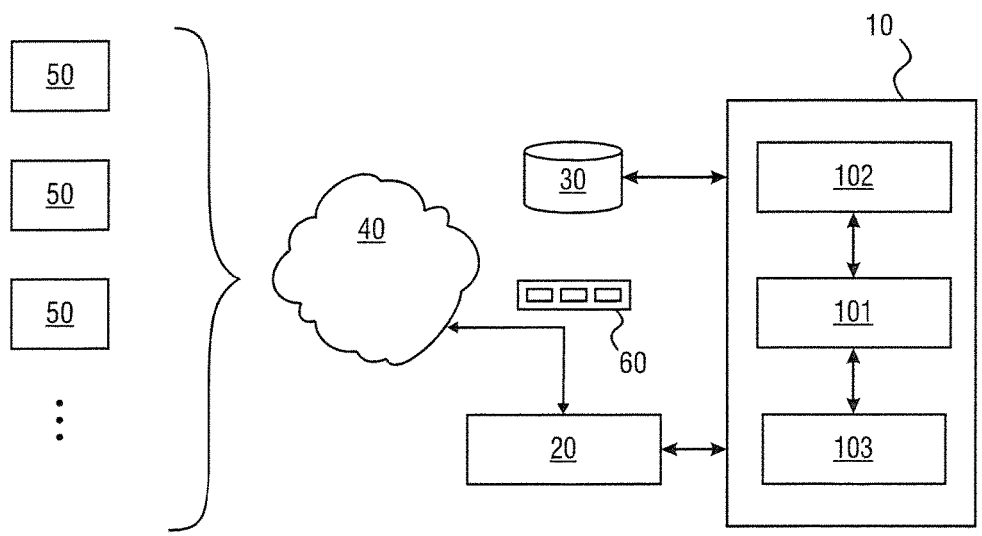
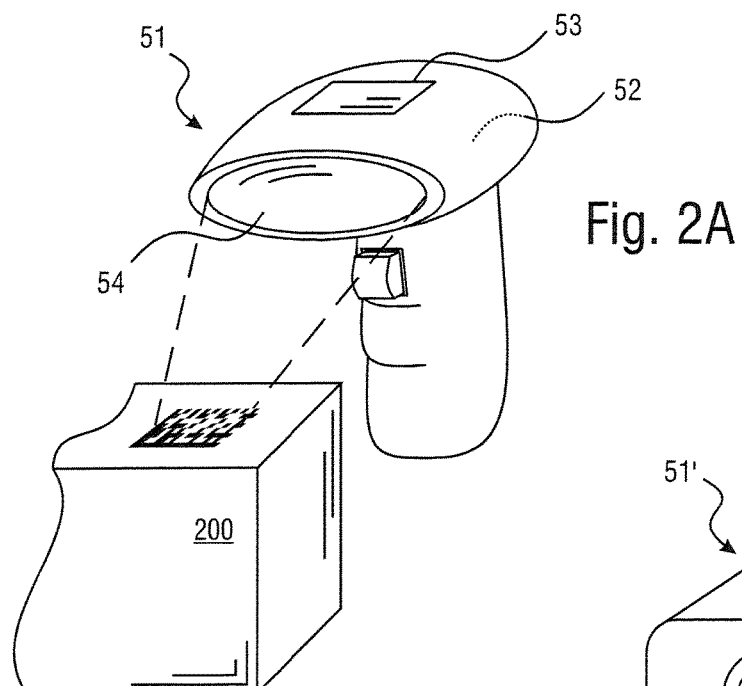
Fig. 2A
Fig. 2B
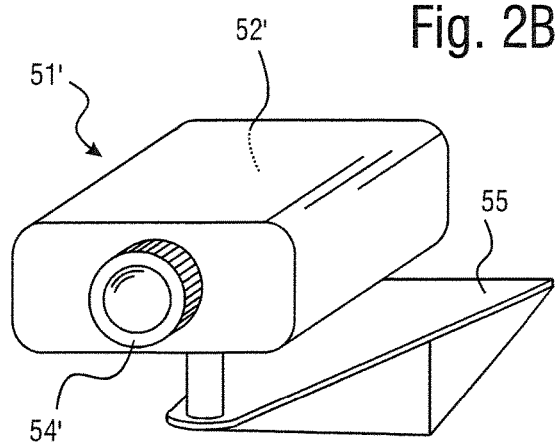

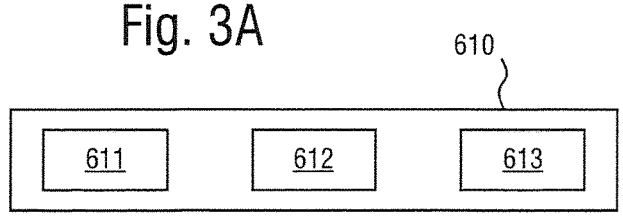
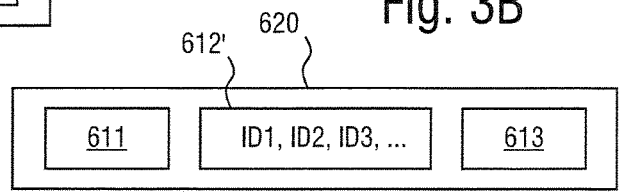
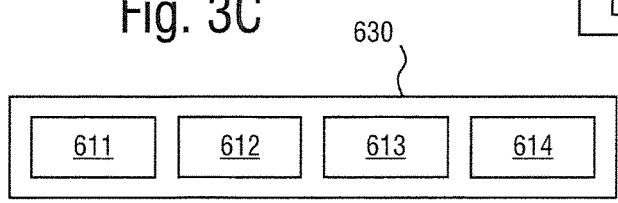
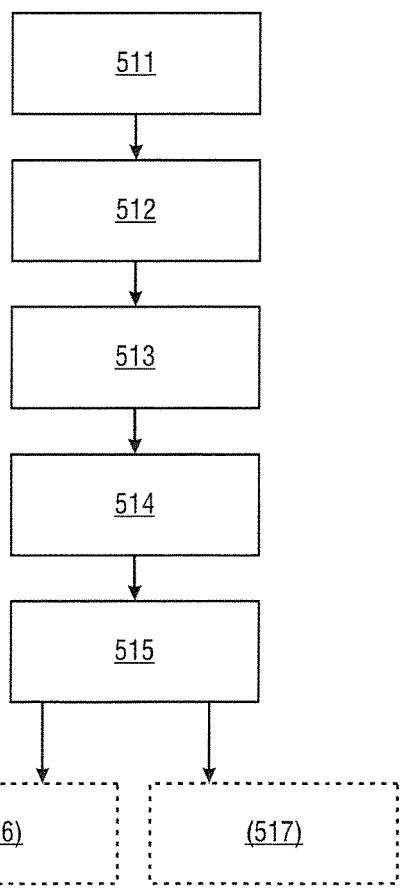
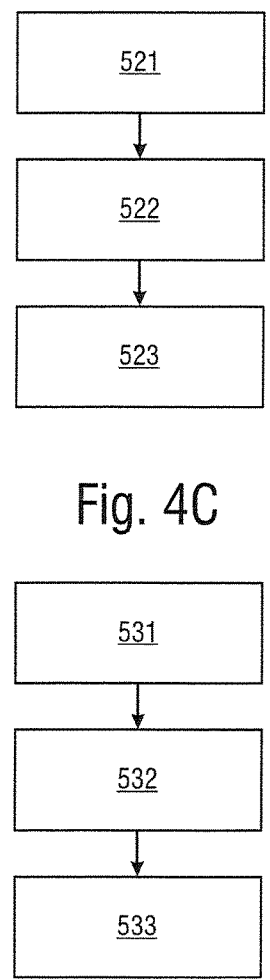

Fig. 5A
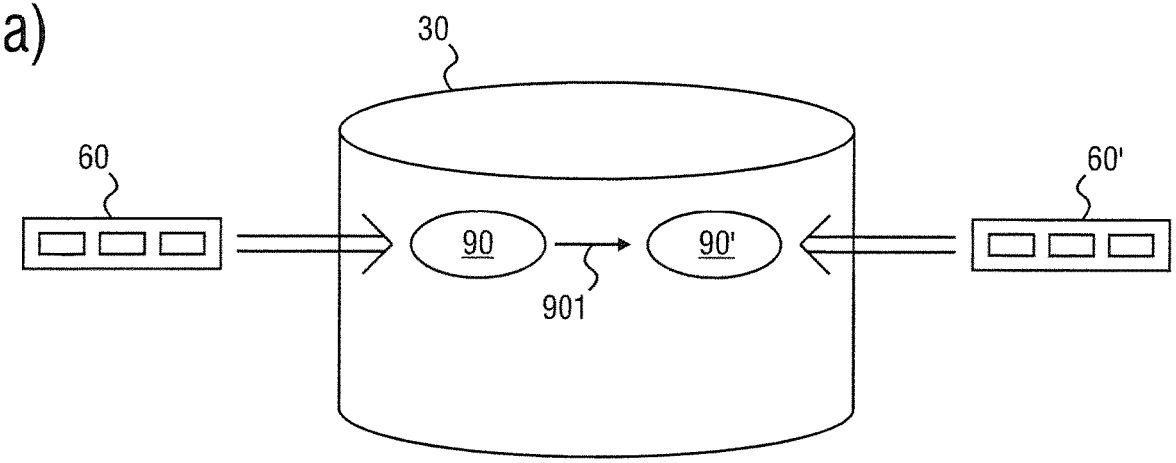
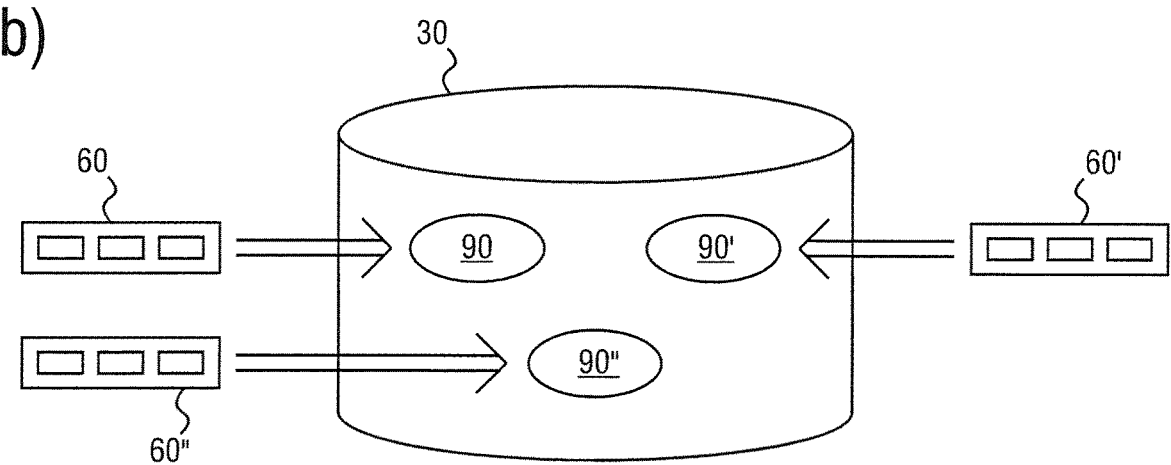
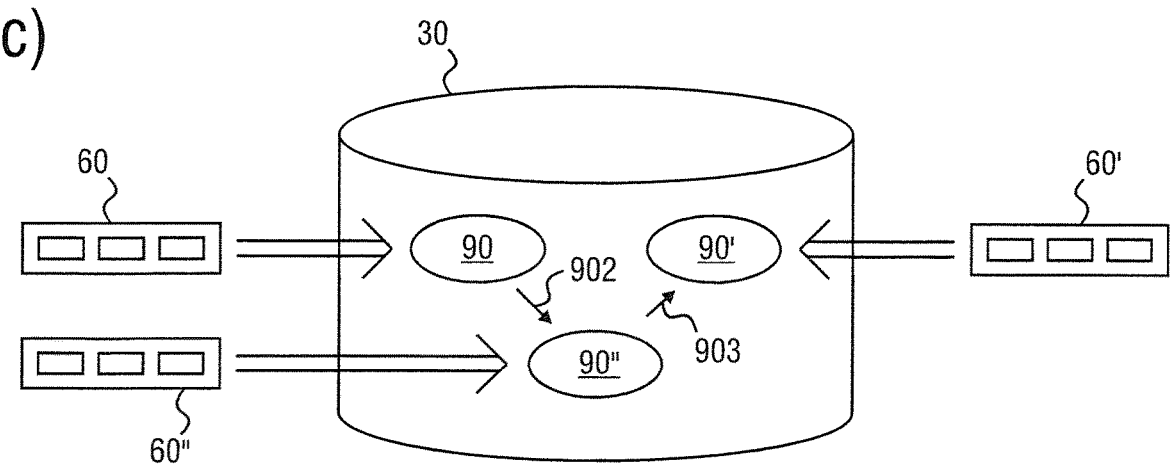

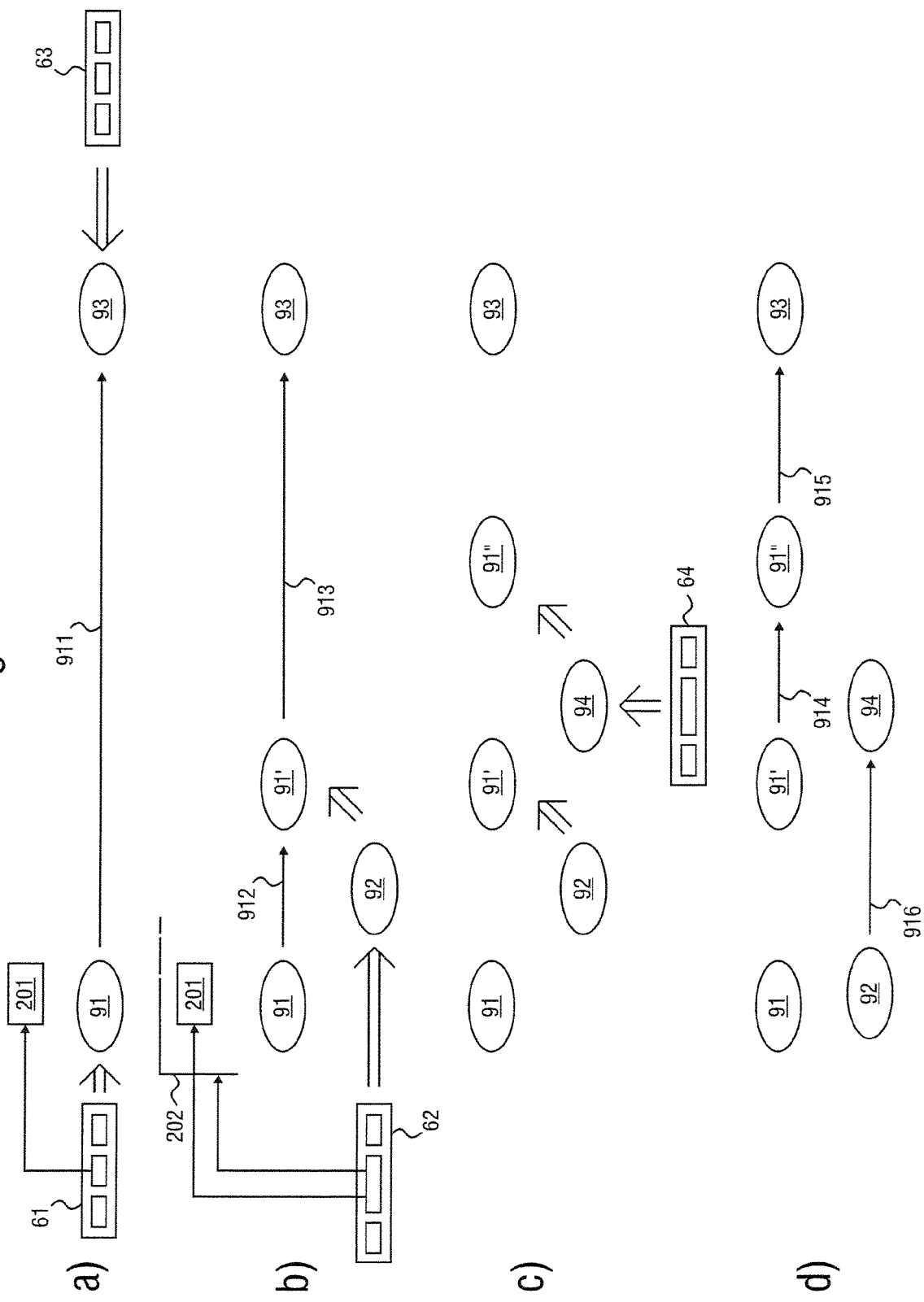

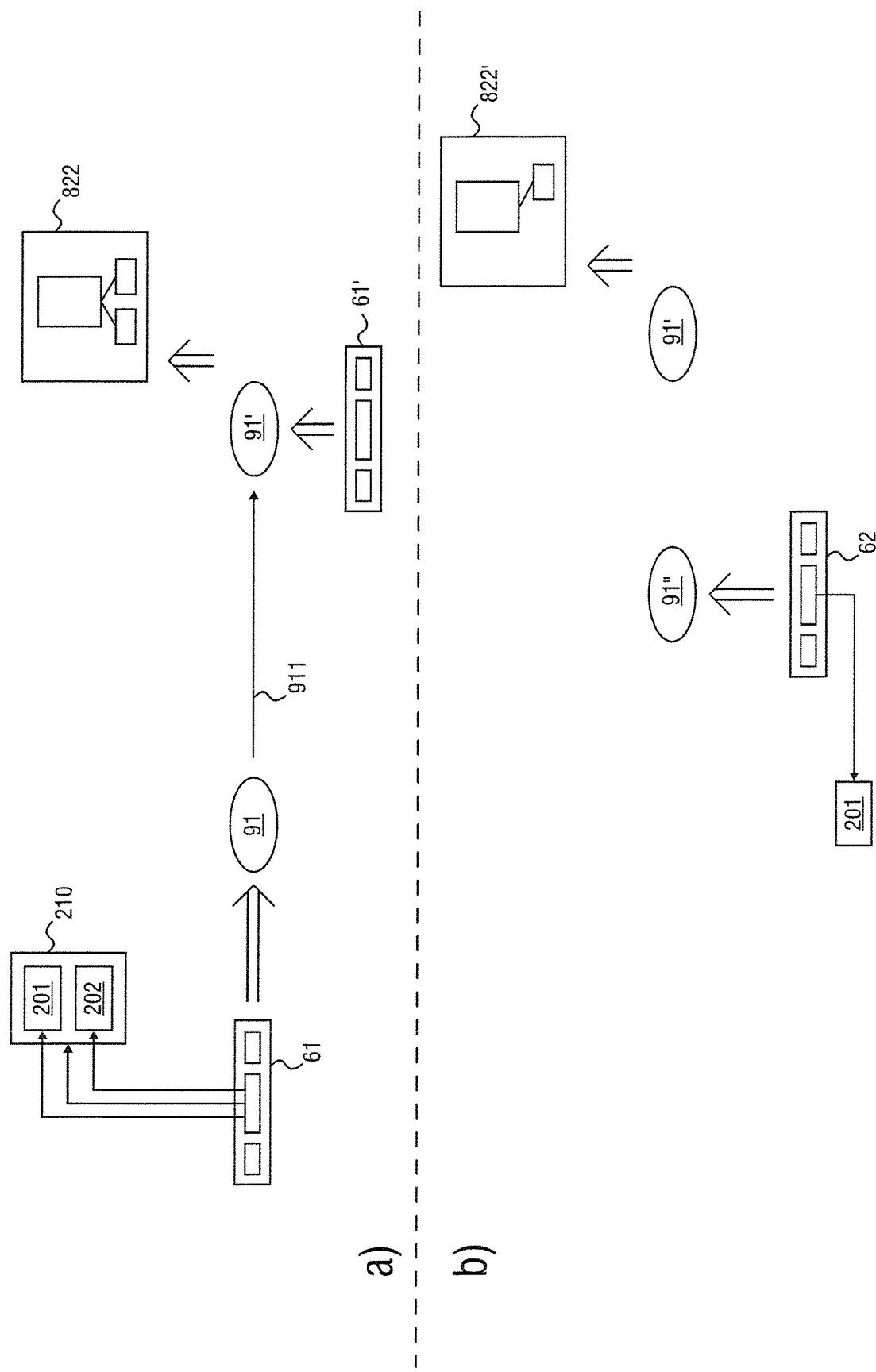

SYSTEMS AND METHODS FOR TRACING ITEMS

TECHNICAL FIELD

The present invention relates to systems and methods for tracing items. More specifically, the present invention relates to systems and methods of handling event data records that include identification information identifying at least one item, operation information indicating an operation on that item, and time information indicating a time when the operation occurred. Moreover, the present invention also relates to corresponding processing entities, computer programs and computer program products.

BACKGROUND

Tracing items is nowadays common practice in various industrial fields, such as the manufacturing and distribution of goods, verification and authentication of items (goods, products, documents, etc.) in the field, logistics, transportation, and the like. This tracing of items is already well supported by various conventional technical systems involving barcode readers, scanners, mobile terminals, network and communication equipment, sensors, detectors, satellite positioning systems, RF-ID equipment, servers, processing entities, data stores, and the like.

On a common scale, however, these systems employing all kinds of individual pieces of technical equipment as mentioned above, are usually distributed over the field, i.e. the area that the system for tracing items is to cover. More specifically, at a manufacturing site there may be installed scanners detecting the presence of items at various locations, delivery personnel may be provided with hand-held devices for registering receipt and delivery of individual or bundled items, communication equipment may receive and forward corresponding data from the scanners, devices, etc. to some central entity that processes, stores, and evaluates the data.

In a way, such systems of all kinds of distributed technical equipment then may allow for tracing one or more items in the field. In particular, the systems may allow for retrieving information on where one particular item is currently located, on what happened, and when, to a particular item, and what is the resulting state of the item as a result of some kind of operation. There are various examples for operations that can apply to items in the field, however common to all operations is that a particular operation puts one item into a particular, well-defined state. For example, an item can be traced to be at a specific location (GPS coordinates, town, country, etc.), traced to have been subject to one or more operation(s) (e.g. sold, opened, crossed a border, etc.) that, in turn, result in specific states of the items (e.g. warranty runs, no longer sellable, exported to another country, subject to tax, etc.).

These systems may be of particular use for optimizing manufacturing, distribution, service, maintenance and related processes. Furthermore, these systems may be used for authenticating and verifying the correct distribution and movement of items. For example, an item can be detected to be subject to an export operation (border crossed), whereas this item is actually not supposed to leave a country due to, for example, requirements regarding technical specifications and/or compatibility with local systems abroad.

Although the usually large-scale distribution of such systems allows for a large coverage area and, consequently, allows for tracing many items over a large geographical zone including many kinds of operations to the items, any distribution of systems usually suffers from difficulties as regards the collection and forwarding of information so as to enable accurate tracing. Specifically, any information collected in the field may be initially off-line, in the sense that a scanner or hand-held device collects data, but processes or forwards the collected data only with some delay, for example, after some pre-determined number of events have been recorded.

This can be the result of how the involved communication equipment works, since for each communication task a connection may need to be established which, in turn, causes power (battery) resources to be consumed or simply may require access to a communication network, which may not be accessible underground or inside of buildings. For example, the system may know that one item was produced in some first country and that later in time this very item was seen in the field in some second country. The information that the item correctly crossed a border may still be local with the transport company or customs authority and is yet to be reported, for example, at a next batch transfer at midnight or when a hand-held device again has access to a (wireless) communication network or is again put into its cradle. Naturally, also cost may play a role, as network operators may charge per connection, so that data is collected and retained deliberately.

In addition to the above, there are conventional systems that consider a so-called batch (or: periodical) processing of collected events, where each batch of events is ordered by time before processing. The period between such two batch processing runs thus defines how delayed events are accepted. All events that are older than a batch period are either rejected or those events, plus all events with a newer event time, need to be reprocessed.

In any way, there is the problem that the events of scanning, detecting, or—generally—subjecting an item to an operation, can suffer from delays when reported to some central data store or processing entity. However, such delays may degrade the accuracy of tracing the items. In a way, the system may not be able to provide accurate tracing with various possible disadvantageous consequences, such as lowering efficiency of the involved processes, causing an unnecessary consumption of energy resources, or—amongst others—triggering of false alerts.

SUMMARY

The above-mentioned objects and problems are solved by the subject matter of the independent claims. Further preferred embodiments are defined in the dependent claims.

According to one aspect of the present invention, there is provided a system for tracing a plurality of items comprising: an interface configured to receive an event data record including operation information indicating an operation, time information indicating a time when the operation occurred, and identification information identifying at least one item; a data store configured to store state information indicating one or more states for each one of the plurality of items; and a processing unit configured to receive via the interface one event data record, and to, in response to receiving the event data record and for the at least one item identified by the identification information included in the received event data record: generate, based on the received event data record, state information indicating a state of the at least one item after the operation; query, from the data store, preceding state information indicating a state of the at least one item directly before the operation, and succeeding state information indicating a state of the at least one item directly after the operation; evaluate, if preceding state information was retrieved in response to querying the data store, a transition between the state indicated by the generated state information and the state indicated by the preceding state information for a first rule conformity, and to, evaluate, if succeeding state information was retrieved in response to querying the data store, a transition between the state indicated by the generated state information and the state indicated by the succeeding state information for a second rule conformity.

According to another aspect of the present invention, there is provided a method for tracing a plurality of items comprising the steps of: receiving an event data record including operation information indicating an operation, time information indicating a time when the operation occurred, and identification information identifying at least one item; storing one or more states for each one of the plurality of items; and receiving one event data record, and, in response to receiving the event data record and for the at least one item identified by the identification information included in the received event data record the steps of: generating, based on the received event data record, state information indicating a state of the at least one item after the operation; querying preceding state information indicating a state of the at least one item directly before the operation, and succeeding state information indicating a state of the at least one item directly after the operation; evaluating, if preceding state information was retrieved in response to the query, a transition between the state indicated by the generated state information and the state indicated by the preceding state information for a first rule conformity, and of, evaluating, if succeeding state information was retrieved in response to the query, a transition between the state indicated by the generated state information and the state indicated by the succeeding state information for a second rule conformity.

According to further aspects of the present invention, there are provided related computer programs and computer program products.

BRIEF DESCRIPTION OF THE DRAWINGS

Embodiments of the present invention, which are presented for better understanding of the inventive concepts and which are not the same as limiting the invention, will now be described with reference to the figures in which:

FIG. 1 shows a schematic view of a system for tracing items according to a general system embodiment of the present invention;

FIGS. 2A and 2B show schematic views of usual equipment involved in systems for tracing items;

FIGS. 3A to 3C show schematic representations of event data records according to further embodiments of the present invention;

FIGS. 4A to 4C show schematic flow charts of method embodiments of the present invention;

FIGS. 5A to 5C show schematically a sequence in line with the general method embodiments of the present invention.

DETAILED DESCRIPTION

Figure 6A:
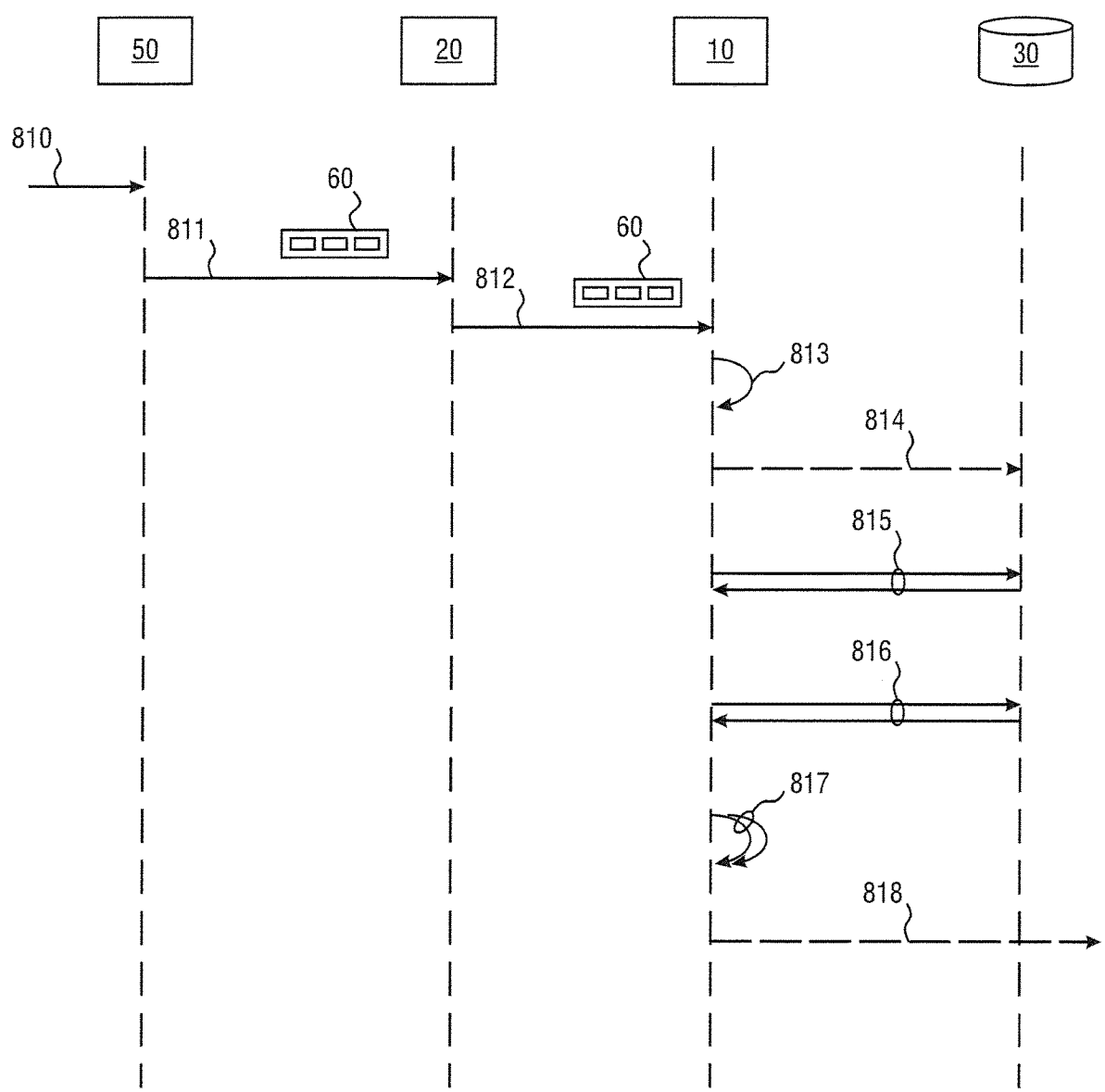
FIGS. 6A to 6C show schematic processing diagrams for processing an event in the form of an operation to one or more items in systems according to embodiments of the present invention.

FIG. 1 shows a schematic view of a system for tracing items according to a general system embodiment of the present invention. The system comprises an interface 20 that is configured to receive an event data record 60 via a network 40. The network 40 may include any one of the internet, a wireless local area network (WLAN), a wireless communication network such as GSM, PCS, GPRS, UMTS, 3GPP, LTE, and related networks, wire-bound networks, ISDN networks, near-field networks (e.g. Bluetooth™), and the like. The purpose of network 40 is generally to convey said event data record 60 from acquisition equipment 50 to the interface 20. Said acquisition equipment 50 may comprise various individual devices and entities, such as scanners, barcode readers, sensors, and the like. Generally, the acquisition equipment 50 is adapted to detect an operation on one or more items which will be described in greater detail below.

The system further comprises a processing unit 10, which, in turn, comprises processing resources 101, memory resources 102, and communication resources 103. Said memory resources 102 (e.g. memory) stores code so as to instruct the processing resources 101 to perform one or more method embodiments as being part of the present disclosure. In this way, the processing unit 10 is specifically configured to receive via the interface 20 one event data record 60, and, in response to receiving the event data record 60, to generate state information based on the received event data record. The state information indicates a state of the at least one item after the operation identified by means of the received event data record 60.

Generally, the state information indicates a state of the item by means of suitable information: for example, the state information may indicate the state as a clear-text message or an identifier defined elsewhere in the system. A clear-text message can contain a string of characters indicating the state in well understandable fashion, e.g. "SHIPPED", "SOLD", "EXPORTED", etc. Likewise, such states may be defined by an identifier that relates to a more detailed definition in a list (code book) defined elsewhere, e.g. the state information may indicate a numerical or alphanumerical value (e.g. "245" or "HCY46F"), that, in turn, point to a more detailed definition in the code book, such as "245=SHIPPED FROM FACTORY". Further, the state information may define the values of one or more attributes of the item. In particular, a list of suitable attributes values can be stored in the state information. The list may also include the definition or identifiers (names) of the attributes as such. Generally, an attribute can be any property associable to the item, including physical observables, locations, field states, etc. Resulting state information may thus look like "LOCATION=ZRH;SOLD=YES;EXPIRES=20150101", or in the example of the state information only carrying the attribute values "ZRH;1;20150101", or the like.

Further, and again in in response to receiving the event data record 60, the processing unit 10, queries from the data store preceding state information and succeeding state information, wherein the preceding state information indicates a state of the at least one item directly before the operation, and the succeeding state information indicates a state of the at least one item directly after the operation. In this way, the data store 30 can store states of an item that "surround" the newly generated state, generated in response to the just received event data record.

Generally, the fact that a state is preceding or succeeding can be determined based on the time information contained in the received event data record: this time information indicates a time at which an operation occurred that altered the state of the item. This new altered state is the one that is generated in conjunction with the so-called state information. This state information can be as such associated with a time indicating the time from which the item assumed the resulting state. Therefore, any state information already stored in the data store 30 which is associated with times before and after can be considered as preceding and succeeding, respectively. The fact that a state directly precedes/succeeds implies that there is no further state being known to (stored in) the data store 30 that is between the generated state and the directly preceding state, and, respectively, the directly succeeding state. Preferably, for the above purposes, all state information, the one generated as well as the ones stored in data store 30, are associated with corresponding time information facilitating the determination of their timely sequence.

However, there will be of course situations in which no preceding state information exists. This may be the case if the received event (event data record) relates to an initializing operation with which tracing for the aforementioned item begins in the system. For example, an operation of "item dispatched from factory" may relate to the manufacture and packaging of one item being completed thus that the item is released into the field. The system may trace items only in the field, so that tracing items in the factory, i.e. prior to its release, is not considered. The event relating to such an initializing operation may thus be the first one with which tracing begins and the item is correspondingly "registered" with the system.

Likewise, there will be of course situations in which no succeeding state information exists. This will usually be the case when the system is up to date, i.e. stores the true and actual recent state of the item. Following the above example, the received event data record may relate to, for example, a shipping operation during which the just released item is shipped. These two operations would directly follow in the sequence so that no succeeding state information will be stored in the data store 30. However, it can be of substantial advantage, that both a preceding state and a succeeding state are considered in any case, and thus (at least) queried from the data store 30, regardless of whether they actually exist or not. The reason is that the received event data record may be delayed in the system although it relates to an event that occurred prior to an event already considered by storing the so-called succeeding state information. In this way, various advantages can be obtained as they are described in greater detail in conjunction with the embodiments described with FIGS. 6A to 6C.

The processing unit 10 then evaluates, if preceding state information was retrieved in response to querying the data store 30, a transition between the state indicated by the generated state information and the state indicated by the preceding state information for a first rule conformity.

Further, the processing unit 10 evaluates, if succeeding state information was retrieved in response to querying the data store, a transition between the state indicated by the generated state information and the state indicated by the succeeding state information for a second rule conformity. In this way, the event related to the received event data record can be evaluated on whether it "fits" into a chain of events and states defined by the mentioned rules.

For example, a rule may define one or more pairs of states that are considered by the system to be in line with some pre-defined sequence of states or state transitions. If a pair of a generated state information and preceding or succeeding state information is not in the set of the pairs of that rule, it can be found that the pair does not conform to that rule. Following again the above example, an event relating to a selling operation should not directly follow the release operation, since selling directly from the factory is forbidden. Generally, a rule defines whether a given transition between the two states of a state pair (or corresponding state information) is conform to the sequence of states/state transitions.

Following the examples and embodiments relating to the state information carrying attribute values, one illustrative case may be that of an attribute defining a location, e.g. by means of country abbreviations. So, preceding state information may define "CH", indicating that the item is in Switzerland, and succeeding state information may define "PL", indicating that the item is in Poland. A rule may now define allowable attribute pairs reflecting some given requirement. For example, the requirement may be that items may only "travel" along geographically defined routes in that only neighbouring countries define allowable pairs (e.g. "CH"→"FR"; "CH"→"DE"; "DE"→"PL", etc.). In this case, the pair may be found to not to comply with the rule since Switzerland has no common border with Poland. However, if the incoming event relates to detecting the item in Germany at a time between the preceding and succeeding state, both transitions, i.e. "CH"→"DE" and "DE"→"PL" may be found to conform to the rule. Of course, the present disclosure is not limited to the above example, since for any attribute conform pairs or non-conform pairs can be defined in a rule. At this point it should be noted that, clearly, the rule can define conformity by both positive definitions (i.e. which transitions do conform) and/or by negative definitions (i.e. which transitions do not conform). The above actions are performed for the sole item identified by the identification information included in the received event data record, or, if the identification information included in the received event data record identifies more than one item, for each of these identified items.

Moreover, the operation and/or type of event can be considered when evaluating rule conformity. Specifically, the operation can determine one out of a plurality of rules that is to be applied for the states under consideration. Following again the above illustrative example relating to attributes defining locations, the rule can define that, for example, a transition in the attribute value should only occur in connection with one or more specific operation(s). For example, the transition from "CH" to "DE" should only occur with the operation "CROSS BORDER". In this way, irregularities can be identified, once the attribute (state) pair does not correspond to the operation. For example, the transition from "CH" to "DE" may not conform to a rule with the operation "PALLET OPENED".

The data store 30 is configured to store the state information for the items that are subject to tracing by the system. As already discussed, the data store 30 stores, as long as already existing, the preceding and succeeding state information. The generated state information, generated by the processing unit 10 in response to receiving the event data record 60, can also be stored into the data store 30 for it storing the most accurate available list of states for each item. The format can be effected in any suitable manner, so that usually the indexing is made with regard to the identification information. This allows for accessing the information of all states so far known to the data store 30.

This information can be appended as needed, for example, when a newly generated state is to be stored in the state history.

Generally, the processing unit 10 can communicate by means of its communication resources 103 to both the interface 20 and the data store 30. The present embodiment should, however, not be limited to the shown configuration in that it is clear that said interface 20 and/or said data store 30 may be part of the processing unit 10, in the sense that the processing unit 10 is, for example, formed by some server entity (server computer, virtual machine of a datacenter, etc.) so that the interface 20 may well be made by further configuring the processing resources 101 accordingly. In this situation, said communication resources 103 may directly communicate to network 40. As far as said data store 30 is concerned, it is to be noticed that this may also be part of the processing unit 10 or may well be some remote data store of a data centre, or accessible by some network, for example also by network 40. The processing resources 101 can take the form of one or more processing units (CPU), and the memory resources 102 that of usual hardware memory devices (hard disk drive, solid state disk, random access memory, Flash-memory, etc.).

FIG. 2A shows an exemplary piece of acquisition equipment in the form of a handheld scanner/barcode reader device 51. Device 51 comprises a window 54 through which a digital image of some marking (e.g. 1D or 2D barcode) on an item 200 that is subject to tracing can be acquired. As shown here, a 2D-barcode is applied to an item and placed in the field of view of device 51. The device 51 further comprises integrated processing equipment 52, usually including a processing unit, a memory unit, and possibly also a communication unit. Besides one or more (optional) operation buttons, device 51 may also comprise a user interface in the form of a display 53 (and/or light indicators, and the like). In case of a display being a touch-sensitive display, it can be dispensed with any further operation buttons/elements, since device operation can be fully facilitated by means of a touch screen. The device 51 may also comprise an optional light source for illuminating an item during inspection. Yet further, additional means may be provided for acoustically notifying an authentication result to a user.

FIG. 2B shows a schematic view of a fixed-type exemplary piece of acquisition equipment as a module 51' operable to be mounted on a production/distribution line for reading markings disposed on items transported on said line. The device 51' comprises a window 54' through which an image of a marking attached to an item, can be acquired. The device 51' further comprises integrated processing equipment 52', usually including a processing unit, a memory unit, and possibly also a communication unit. Besides one or more (optional) operation buttons, device 51' may also comprise an optional light source for illuminating an item during the acquisition of the image. An additional fixation element 55 may be provided for mounting the device 51' at, for example, a specific location in a production line in which a plurality of items pass by the device. The specific location may be associated with a specific event, so that any detection result from device 51' can be identified as a specific operation having applied to the item. The device may, of course, take other forms and may be wire-bound or wireless.

In the embodiments described in conjunction with FIGS. 2A and 2B, the corresponding processing resources are configured to determine the occurrence of an event and to compile correspondingly an event data record for immediate or later forwarding to the system's interface. More specifically, the acquisition of an image that comprises a marking on an item can trigger decoding the contents of that marking for obtaining some kind of information that identifies the item. For example, a 2D-barcode disposed on an item can carry a serial number that can serve as more or less uniquely identify that item. This information can be hence used for generating the identification information as being part of an event data record.

It is noted that—generally—no strict uniqueness needs to be ensured, since identifiers may be reused over time, for items of different types or in different geographical zones. For example, a set of unique identifiers may be reused after the items being identified usually have expired or decayed (e.g. perishable goods such as a bottle of fresh milk can be identified by means of reused identifiers after, say, half a year). Further, unique identification of some item type may also be dispensed with completely: for example, a plurality of cigarette packages may carry all the same identifier. However, by associating all these packages to one bundle (pallet, shipping), the tracing of any one of these packages still allows tracing of the bundle. Of course, any other mechanism for plausibly distinguishing two items with the same identifier or tracing items with identical identifiers may apply.

As far as the operation is concerned, this may be implicit to the location and/or operation of the devices 51, 51'. In the example of the fixed device 51', its respective location at an end of a conveyor may imply that any item that passes that location (i.e. is registered/detected by device 51') has completed manufacturing and is thus released. Furthermore, the kind of operation can be set to the devices in that, for example, a user select a specific operation by means of the user interface 53 of hand-held device 51 before scanning the item. This has the advantage that a plurality of operations can be considered by one single device. Thus, the operation information can be generated. Likewise, the time information can be generated by, for example, accessing a clock internal to the device. In this way, one complete event data record can be compiled.

Common to devices 51 and 51' is, as examples for acquisition equipment, that they generate an event data record for forwarding it to the system's interface. Preferably, the devices take into account environmental requirements when transmitting one or more event data record. For example, hand-held device 51 may communicate via a wireless access network (WLAN, UMTS, etc.) which may not be available everywhere. Therefore, the device may collect all generated event data records until network access is available and all collected records can be forwarded at one time. Charging schemes of the employed network may also play a role, since it can be preferable to perform a batch transfer of more than one record to avoid cost for sending "ad hoc" each generated record individually. This applies similarly to the fixed-type equipment, since available communication channels may be shared with other applications or the factory as such reports any events on a batch basis anyway. It is an advantage of embodiments of the present invention that the effects associated with such delays are substantially attenuated.

Generally, the actual configuration of said detection equipment 50 is not restricted to the shown examples. Likewise, radio frequency identification (RFID) or any other type of physical detection can apply, as long as the occurrence of an event can be determined, and a corresponding event data record accordingly be generated.

FIG. 3A shows a schematic representation of an event data record 610 according to a further embodiment of the present invention. As shown, event data record 610 comprises time information 611, identification information 612, and operation information 613. Said time information 611 indicates a time when an operation occurred. More specifically, said operation applies to one or more items being subject to tracing. Generally, an operation is an act that puts one or more items into a well-defined state, in that this state after the operation usually differs from the state before the operation. Therefore, the operation generally alters the state of the one or more items to which it is applied.

Examples of suitable operations include completing a manufacturing stage of an item, completing manufacturing as such of one item, testing one or more properties of an item, packing an item, putting an item to a specific location, shipping of one item, opening an item, selling an item, unpacking an item, detecting an item at a specific location and/or time, determining a physical observable of an item (e.g. temperature, pressure, mass, volume, etc.), repacking an item, detecting an item to leave a specific area (factory/premises area, regional area, country, jurisdiction area, etc.). In any way, the type of operation is indicated by said operation information 613 comprised by the event data record 610.

The identification information 612 of the event record 610 identifies the item that was subject to the operation at the specific time. Just as for said time information 611 and said operation information 613, also the identification information 612 may take any suitable form in that usually a string of characters (bytes) represents a more or less unique identifier identifying the item. It is noted that no strict uniqueness needs to be required, since identifiers may be reused over time or a plurality of items carrying one identifier are associated to one superordinate item (see above). As regards the operation information 613, usually a couple of characters (bytes) may suffice, since an operation can be identified by means of a code list in which some operation identifier is associated to a specific operation that can be defined in greater detail elsewhere in the system.

FIGS. 3B and 3C show schematic representations of event data records according to a further embodiment of the present invention. Specifically, the identification information 612' of event data record 620 is expanded by accommodating means for identifying a plurality of items. For example, identification information 612' accommodates a plurality of identifiers, each of which identifying one individual item. It is to be noted that the items of said plurality may not need to be identical or of the same type. Quite to the contrary, one identifier may identify a bundle of several items that are different, similar, or of same type, and that are, at least in part, correspondingly identified by the remaining identifiers of the identification information 612'. In this way, a means is provided for defining a hierarchical association in that one superordinate item, for example identified by ID1, is a collection of one or more subordinate items, for example identified by ID2, ID3, . . . .

In FIG. 3C, an event date record 630 is appended by location information 614 which can indicate a location at which the operation took place on an item at a given time. The location information 614 may again take any suitable form that can more or less uniquely identify a location. Examples include geographical positions (GPS/GLONASS/Galileo coordinates), location codes (e.g. IATA or similar letter codes such as ZRH, JFK, etc.), ICANN country codes, or any other codes for identifying a location or a location area. It should be clear that the embodiments as shown in conjunction with FIGS. 3A to 3C may be combined in any suitable form. For example, the event data record 620 may be appended with the location information 614 such as in the case of event data record 630.

FIG. 4A shows a schematic flow chart of one method embodiment of the present invention. Specifically, an embodiment is shown for tracing a plurality of items. This embodiment comprises a step 511 (STORE STATE INFORMATION) of storing state information indicating one or more states for each one of the plurality of items to, for example, a data store. In step 512 (RECEIVING EVENT DATA RECORD), an event data record is received from, for example, an interface forwarding the event data record from in-field equipment. The event data record includes operation information indicating an operation, time information indicating a time when the operation occurred, and identification information identifying at least one item.

Step 512 of receiving an event data record triggers the following steps so that they are performed in response to receiving the event data record in step 512, and so that they are performed for the at least one item identified by the identification information included in the received event data record. If the received event data record carries identification information that identifies more than one item, the following steps can be performed for each item being identified. These steps are at least steps 513, 514, and 515.

In step 513 (GENERATE STATE INFORMATION) there is (new) state information generated based on the received event data record. The generated state information indicates a state of the at least one item after the operation defined by the operation information as part of the received event data record. In step 514 (QUERY PRECEDING/SUCCEEDING STATE INFORMATION), preceding state information indicating a state of the at least one item directly before the operation, and succeeding state information indicating a state of the at least one item directly after the operation, are queried, for example from the data store. It is to be noted that the actual order can well be different from the described order. In particular, the steps can be performed in any order as long as step 515 (EVALUATE TRANSITIONS) of evaluating has all information ready, if it exists.

After the (new) state information was generated in step 513 and both the preceding state information and the succeeding state information have been at least queried in step 514, the method can proceed to step 515 of evaluating the possible state transitions. Specifically, if preceding state information was retrieved in response to the query in step 514, a transition between the state indicated by the generated state information and the state indicated by the preceding state information can be evaluated for a first rule conformity. Likewise, if succeeding state information was retrieved in response to the query in step 514, a transition between the state indicated by the generated state information and the state indicated by the succeeding state information for a second rule conformity.

In general, the terms first and second rule conformity relate to first and second results from evaluating conformity to a rule. The first result relates to evaluating the pair of preceding state information and the generated (new) state information, and the second result relates to evaluating the pair of succeeding state information and the generated (new) state information. Thus, if both preceding and succeeding state information existed, two results are available for the received event data record. Usually, the generated state information can also be stored in optional step 516 (STORE GENERATED STATE INFORMATION).

A specific example of this general embodiment of the present invention is further explained in FIGS. 5A a) to c). Specifically, FIG. 5A a) schematically shows a first event data record 60 with time information indicating a first time and a second event data record 60" with time information indicating a second time after said first time. Event data records 60, 60' resulted in state information 90 and 90' being stored in the data store 30. A first transition 901 may or may not be conform to a corresponding rule.

FIG. 5A b) shows the situation in which a further event data record 60" is received with time information indicating a further time between said first time and said second time. The resulting state information 90" may be already stored in the data store 30 (as shown) or, alternatively, may also be well only preliminarily calculated and kept outside data store 30. In any case, having now three sets 90, 90', and 90" of state information readily allows evaluating also the further transitions as shown in FIG. 5A c). Specifically, now transitions 902 and 903 can be evaluated with regard to conformity to the corresponding rule(s). For example, if transition 901 was found not to conform to the applicable rule, the now present transitions 902 and 903 following the actual timely sequence given by the first time, said further time, and the second time, may both found to conform to the applicable rule(s).

Optionally the results from the evaluating step 515 can trigger notifications or alerts in step 517 (NOTIFICATION/ALERT).

With now reference to FIGS. 4A and 5A, the evaluating step 517 of transition 901 can thus trigger a notification indicating a non-conformity, as this transition does not conform to the applicable rule. However, after reception of the further event 60" indicating said further time and evaluation of transition 902 as being conform to the applicable rule, a new transition 903 between state 90" and state 90' is created, i.e. time information indicating the further time of event 60" is added in the time series of state 90', and the notification of non-conformity associated with state 90' is updated by replacing the non-conformity information with an information specifying that the transition is valid. This corresponds to an implicit cancellation of previous (non-conform) transition 901.

In general, a notification consists of a specific action taken in response to specific result from evaluating rule conformity. This action is able to bring the result to the attention to other processes and/or (human) operators or another recipient responsible for, in turn, deciding on further actions in response to the notification. An alert is different from a notification insofar that the alert comprises additional actions that distinguish the alert to be of higher significance/priority as compared to a (mere) notification. For example, said additional actions may comprise waiting for an acknowledgement of the alert, in the sense that a specific operator may be required to acknowledge receipt of the alert.

A notification or alert may take the form of an electronic message, like SMS (short message service), email or any other electronic message format. It can contain details of the relevant items and their corresponding state, and may be used to trigger one or more processes such as the generation of reports, manual intervention by operators, etc. A notification or alert may also, for example, trigger automatic activation (via a control unit) of an operation, such as quality control actions on a production/packaging/conveyor line, ejecting an item from that line, checking stocks or specific pallets, label printing, etc. Again, the shown order can well be different in that the generated information is stored at any time after generation, and the triggering of a notification or alert can be in response to the first rule non-conformity detected.

FIG. 4B shows a schematic flow chart of another method embodiment of the present invention based on the embodiments as shown and described in conjunction with FIG. 4A. Specifically, this embodiment relates to the case where the identification information identifies at least one further item (i.e. a plurality of items), wherein that at least one further item is associated to the one item. For example the one item relates to a bundle of several items, wherein the further item is one the constituent items of the bundle. The present embodiment comprises for this purpose a step 521 (GENERATING SECOND STATE INFORMATION) generating, based on the received event data record, second state information indicating a state of the further item after the operation defined in the operation information of the received event data record. Again before or after step 521, this embodiment comprises a step 522 (QUERYING SECOND PRECEDING/SUCCEEDING STATE INFORMATION) of querying second preceding state information indicating a state of the further item directly before the operation, and second succeeding state information indicating a state of the further item directly after the operation.

Once the second state information was generated in step 521 and both the second preceding state information and the second succeeding state information have been at least queried in step 522, the method can proceed to step 523 (EVALUATE STATE TRANSITIONS) of evaluating, if second preceding state information was retrieved in response to the query in step 522, a transition between the state indicated by the second generated state information and the state indicated by the second preceding state information for a fourth rule conformity, and, if second succeeding state information was retrieved in response to the query in step 522, a transition between the state indicated by the second generated state information and the state indicated by the second succeeding state information for a fifth rule conformity.

A specific example of this general embodiment of the present invention is further explained in FIGS. 5B a) to d). Specifically, FIG. 5B a) schematically shows a first event data record 61 with identification information identifying a first item 201. As a result, first state information 91 can be generated for that first item 201 which is identified by the identification information of the event data record 61. This state information 91 indicates the state of the first item 201 at a first time indicated by the time information of the event data record 61. Likewise, a further event data record 63 for this first item results in state information 93 for the first item at a second time after said first time. Accordingly, a transition 911 can be evaluated for conformity to an applicable rule.

FIG. 5B b) shows schematically the receiving of an event data record 62 with identifying information identifying a further item 202 and the first item 201. As a consequence, the operation information in the event data record 62 affects not only the state of that further item 202, which is reflected by the accordingly generated state information 92, but also the state of the first item 201. Therefore, new state information 91' for the first item 201 is generated indicating a state of the first item 201 at a time between the first time and the second time following the assumption that event data record 62 carries time information indicating a time between this first and second time. As a consequence of the newly generated state information 91', the transitions 912 and 913 between the states indicated by state information 91 and 91', and, respectively, 91' and 93.

As shown in FIG. 5B c), a further event data record 64 is received which by means of its identifying information again identifies at least the first item 201 and the further item 202. As a consequence for both items 201 and 202 corresponding state information 91" and 94 can be generated which indicate states at one or more times between the first and second time dependent on the time indicated by the time information of event data record 64. As a result and as shown in FIG. 5B d), state transitions 914 and 915 can be evaluated for the first item 201 and at least a state transition 916 can be evaluated for the further item 202. In general, the case of the identifying information identifying more than one item, these items may be associated to each other or these items may have a relationship. For example, the shown first item 201 may be an individual product (package), whereas the second item may be a bundle of more than one of such individual products in the form of a carton, a pallet, or the like.

FIG. 4C shows a schematic flow chart of another method embodiment of the present invention based on the embodiments as shown and described in conjunction with FIG. 4A. Specifically, this embodiment relates to the case where a related item can be identified that is associated to one of the items identified by the identification information included in the received event data record. In this case, said state information that indicates the state of the item after the operation is generated further based on state information queried from the data store and indicating a state of the related item.

This embodiment then comprises a step 531 (GENERATE THIRD STATE INFORMATION) of generating, based on the received event data record, third state information indicating a state of the related item after the operation. Similarly to the other method embodiments, a step 532 (QUERY THIRD PRECEDING/SUCCEEDING STATE INFORMATION) queries third preceding state information indicating a state of the related item directly before the operation, and queries third succeeding state information indicating a state of the related item directly after the operation. In general, the present embodiment allows for processing of events that indirectly relates to items subject to tracing. More specifically, state transitions of items can be evaluated, where said items are not directly identified by the incoming event data record. For example, the received event relates to an opening operation of one pallet. In the data store (or elsewhere) there can be information on what further items formed part of that pallet, so that receiving an event data record relating to the pallet allows for evaluating state transitions for the constituent individual items in the form of the so-called related items.

Once the third state information was generated in step 531 and both the third preceding state information and the third succeeding state information have been at least queried in step 532 (in arbitrary order), the method can proceed to step 533 (EVALUATE STATE TRANSITIONS) of evaluating, if third preceding state information was retrieved in response to the query in step 532, a transition between the state indicated by the third generated state information and the state indicated by the third preceding state information for a sixth rule conformity, and, if third succeeding state information was retrieved in response to the query in step 532, a transition between the state indicated by the third generated state information and the state indicated by the third succeeding state information for a seventh rule conformity.

A specific example of this general embodiment of the present invention is similar to the one explained in conjunction with FIG. 5B, except for the need for any identification information explicitly identifying related items. More specifically but following the example as given with FIG. 5B, a received event data record may carry identification information identifying only one, say, the first item 201. The relation between the first item 201 and the second item 202 may not be established by means of extra information in the identification information. Rather, the relationship is established by querying the data store. In this way, state information 91' and 91" can be generated even if event data records 62 and 64 carry identification information identifying (only) the second item 202. For again the example of that second item 202 being a bundle of several individual first items 201, the data store may store a list for the second item carrying information on what individual first items 201 form part of this second item 202.

A further embodiment of the present invention is explained in FIGS. 5C a) and b). Specifically, FIG. 5C a) schematically shows a first event data record 61 with identification information that identifies a first item 201 and a second item 202 that are both related or associated to item 210. The latter item 210 may be, for example, a pallet which carries items 201 and 202. In a way, the first and second items 201, 202 have a hierarchical relation to the superordinate item 210. The event data record may thus result in state information 91 defining the states of all items, namely item 201, item 202, and item 210.

A second event data record 61' may carry identification information identifying any one or all of items 201, 202, and 210. The second event data record 61' however results in state information 91' defining a state to which a transition 911 from the preceding state, defined by state information 91, can be evaluated. The present embodiment considers the case that the evaluation of transition 911 or the event 61' as such results in a notification 822 that carries some information relating to the association between the involved items. For example, the hierarchical relation amongst items 201, 202, and 210 can be defined by notification 822. In general, in this embodiment a notification thus carries information on the relationship between items that are identified by the identification information. Likewise, this explicit definition by means of the identification information is not strictly necessary since the relation can also be obtained by querying the data store so that it can be included in a notification.

As far as a notification is concerned, it should be noted that a notification can be tied to a transition (or evaluation thereof), to a state, and/or an event. While, in the case of a notification being an alert, it may have been raised in response to evaluating a transition (i.e. invalid movement) and it should be tied to the event which caused the transition to be discovered—hence notification 822 can be linked to event 61' and/or state 91'. This makes particular sense in the case of notifications, which are more tied to a particular state being encountered rather than a transition. This can be of further importance, because a notification/alert can be considered valid only at the time of that discovering state. If, for example, a new state is considered so that the sequence may becomes 91→91"→91', the previously evaluated transition 911 never actually happened, but the notification 822 may still have been raised by the processing of event 61' and/or state 91'.

FIG. 5C b) schematically shows the reception of a further event data record 62 that carries identification information identifying at least one of the items. Specifically, the example considers that at least item 201 is identified and that the operation information of event data record 62 relates to dissolve the relationship between item 201 and item 202 and/or item 210. In general, an event can also affect the relationship amongst (previously) associated items. Following the above example of a pallet carrying several individual items, the operation reported by event data record 62 may relate to removing one item from a pallet, which would then be represented by item 210 whereas the removed item itself would be represented by item 201. The previously issued notification may still apply, but its content may be modified.

For example, this can be effected by changing notification 822 into notification 822' (e.g. by means of a notification update). Specifically, notification 822' may comprise updated information relating to the association between the involved items, i.e. the hierarchical relation amongst remaining items 202 and 210.

Specifically, the issuing of corrections to a notification may particularly happen when processing out of order or delayed events. In the shown scenario, the processing of event 61' (including transition 911 and/or states 91,91') raises the notification 822 with a particular hierarchy of items. As state 91" can be chronologically after state 91', it cannot issue a correction to notification 822, with the consequence that notification 822 is still correct at the time of state 91'. Therefore, event 62 causes a change to the hierarchies between the existing states 91 and 91', whereby the hierarchy information which was present when event 61' was previously evaluated is now known to have been incorrect, hence a correction 822' to notification 822 needs to be generated for event 61' (state 91').

FIG. 6A shows a schematic processing diagram for processing an event in the form of an operation to one item in a system according to the embodiments of the present invention. Specifically, it is again referred to the acquisition equipment 50, the interface 20, the processing entity 10, as well as to the data store 30, as these components have been described in greater detail in conjunction with FIG. 1. The shown procedure starts with an operation being applied to an item, this operation being reported by means of an event 810 to a corresponding piece of acquisition equipment 50. This recipient piece of acquisition equipment 50 then generates an event data record 60 which is forwarded in 811 to the interface 20. For example, the piece of acquisition equipment 50 may be in the form of a detector that detects one specific item at a specific location (e.g. manufacturing stage in a factory, location on a conveyor belt, etc.). Following this example, event 810 can be identified as relating to a completion operation by detecting the presence of a given item at a one specific location at a corresponding time.

From this, the acquisition equipment 50 can generate the event data record 60 and can forward it in 811 to the interface 20. Interface 20 receives (and possibly collects a plurality of) event data records and forwards them individually in 812 for processing to processing unit 10.

Based on the received event data record 60, the processing entity 10 then generates state information in 813 indicating a state of the item after the operation, both identified by means of the received event data 60. Optionally, this generated state information can be stored in 814 to the state history kept in the data store 30 for each item. The processing unit 10, again in response to receiving the event data record 60 in 812, then queries in 815 from the data store preceding state information of the item (identified by means of the received event data record) and, likewise, in 817 succeeding state information.

If said preceding state information was successfully retrieved in response to the query in 815, a transition between the state indicated by the generated state information and the state indicated by the preceding state information is evaluated in 817 for a first rule conformity. Likewise, in 817, if succeeding state information was successfully retrieved in response to the query in 816, a transition between the state indicated by the generated state information and the state indicated by the succeeding state information is evaluated in 817 for a second rule conformity. It is to be noted that the described order of actions 815 to 817 can be different. For example, the preceding/succeeding state information may be queried only after the new state information was generated.

Based on the evaluation regarding said first and/or said second rule conformity, some kind of result can be notified in 818. For example, if one of the rule conformities is violated, the notification 818 can be in the form of an alert. This alert, in turn, may indicate that the received event data record 60 relates to an event being unexpected and/or violating some requirement. For example, the received event data record 60 relates to an event that can usually not occur due to the item being in a state indicated by the preceding state information currently stored in the data store 30. For example, the event 810 relates to detecting an item at a specific location, whereas the stored preceding state information indicates (or: would suggest) that the item cannot be detected at that location. Following this example, a possible scenario may look like this: the preceding state information stored in data store 30 indicates that an item is still subject to a manufacturing or packaging process and thus should not have left the factory yet, but the received event 810 relates to detecting exactly this item already in the field.

Figure 6B:
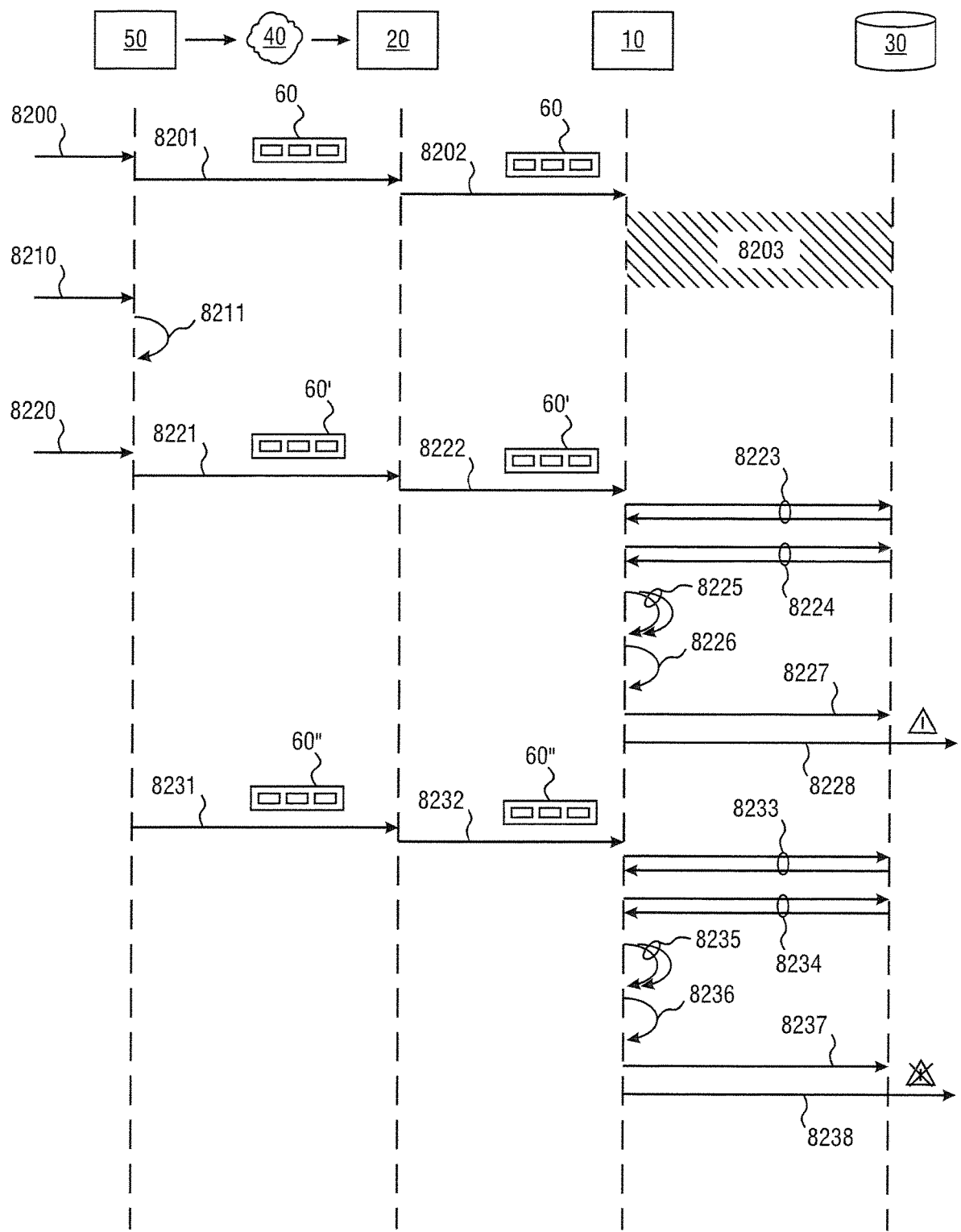

FIG. 6B shows a schematic processing diagram for processing another event scenario in a system according to the embodiments of the present invention. It is again referred to the acquisition equipment 50, the interface 20, the processing entity 10, and the data store 30. The shown procedure starts with an operation being applied to an item, this operation being reported by means of an event 8200 to a corresponding piece of acquisition equipment 50. This recipient piece of acquisition equipment 50 then generates an event data record 60 which is forwarded in 8201 to the interface 20. From this, the procedure proceeds similarly to that shown in conjunction with FIG. 6A. Namely, the event data record is forwarded in 8202 to the processing unit 10 and the generation of new state information, the query of the preceding and succeeding state information as well as their corresponding evaluation with regard to rule conformities take place in 8203. The result of that collection 8203 of procedures will be, however, that one item is registered in the system and there is available at least one state information for that item.

As compared to event 8200, a further event 8210 takes place at a later point in time. However, an event data record may be generated but it is retained in 8211 so that it does not reach the interface 20. Besides retaining locally (e.g. with the acquisition equipment 50 or within the network 40 between equipment 40 and interface 20) a generated event data record, the same may result if the event 8210 is detected, but the generation of its corresponding event data record is delayed.

Then, again at a later point in time, a further event 8220 occurs, its corresponding event data record 60' reaches the interface 20 in 8221 and is forwarded in 8222 to the processing unit 10. In response to receiving this event data record 60', the processing entity 10 then queries in 8223 and 8224 preceding and succeeding state information, generates in 8225 state information in indicating a state of the item after the operation that are both identified by means of the received event data 60'. It is now assumed that at least said preceding state information was successfully retrieved in response to the query in 8223, due to the actions that took place in conjunction with event 8200. Therefore, a transition between the state indicated by the generated state information (in response to event data record 60') and the state indicated by the preceding state information (based on event data record 60) can be evaluated in 8226 for rule conformity.

Looking at the actual sequence of events 8200, 8210, and 8220, however, suggests that the evaluation in 8226 will not yield rule conformity. Noting the fact that event 8210 was so far not yet considered by the processing unit 10, a transition between the state resulting from the operation of event 8200 and the state resulting from the operation of event 8220 may not be considered as conforming to a rule. For example, the item under consideration may have been released into the field to a first country with event 8200, but was detected in another country with event 8220. However, a direct way from the manufacturing site to another country may be regarded as inadmissible, due to, for example, possible violations of applicable requirements. As a consequence, processing unit 10 may launch a notification 8228 in the form of an alert, indicating that an item was detected at an impermissible location. In 8227, the generated state may be stored to the data store 30 in the form of corresponding state information.

Then, again at an even later point in time, event 8210 is reported by transmitting the corresponding event data record 60" that reaches the interface 20 in 8231 and, eventually, the processing unit 10 in 8232. For example, the piece of acquisition equipment 50 that detected event 8210 but retained record transmission in 8211 became now online (access to a network), so that event data record 60" was launched. In 8233 to 8236 again the generation of state information and the query of preceding and succeeding state information may take place as described above. Looking at the actual timely sequence of events 8200, 8210, and 8220, it is now clear that both queries 8233 and 8234 will be successful, since the state as the result of the operation with event 8210 will be valid in between the states as the results of, respectively, the operations with events 8200 and 8220.

Following the above example, event 8210 may relate to a border crossing operation (e.g. the item is detected at a customs check point). This may, however, now result in both transitions, namely that between the preceding state (resulting from the operation of event 8200) and the generated state (resulting from now processing the operation of event 8210) and that between that generated state and the succeeding state (resulting from the operation of event 8220) conform to rules. In 8237 the newly generated state can be again stored to the data store 30. Further, the previously generated notification 8228 can be cancelled in 8238, since it does obviously no longer apply.

Alternatively, any previously generated notification can also be corrected or changed instead of being cancelled, whenever the previously issued alert may no longer apply, but even the further evaluation showed that the transition still not complies with the rule for other reasons. Further, the previously issued alert may still apply, but its content is modified, while the time of the alert and/or its status (type of alert) may remain unchanged. Therefore, the content of a previously issued alert can modified in view of the new state.

For example, this may be the case if there are actually more than the one event 8210 missing (between events 8200 and 8220) when the event data records 60' and 60" are processed in 8223 to 8227, and, respectively, 8233 to 8237.

One aspect of the embodiments of the present invention can demonstrate various advantages at this point. More specifically, the time information comprised in the event data records allows for generating state information that indicates item states at various points in time. This, in turn, allows for timely ordering all states of an item and accordingly evaluating transitions between adjacent (in time) states. Furthermore, since event data records are processed in response to their respective reception (i.e. availability to the processing unit), a delayed event data record can heal a previously invalid state transition. As far as rule conformity is concerned, the event data records are considered not with regard to their time the processing unit 10 receives the records, but with regard to the time that their corresponding events actually took place. This advantageously allows for accurate tracing of items although event data records can be delayed in the system.

Furthermore, embodiments of the present invention can dispense with any batch processes: specifically, the embodiments can process any event regardless of how old this event is, i.e. how long the time span is between the time of receiving the event data record (and processing it) and the time the event/operation took place. As compared to batch processing and other conventional concepts which can consider events up to a delay corresponding to the batch interval, the embodiments of the present invention can consider virtually any delay for making the tracing of items independent from any batch cycle period (interval), and, additionally, can dispense with batch processing as a whole that—amongst others—usually depends on reliable scheduling and may require maintenance or (batch) processing periods during which a system can be inaccessible.

More specifically, batch processing usually involves setting a threshold concerning a permissible delay for reception of events, but if an event arrives later than this delay it may be practically refused in the sense that it is not considered in the batch, and, as a result, the information resulting from that batch processing may be erroneous. To still consider the late event or simply if an event in a next batch processing requires it, reprocessing of a previous batch can be performed. However, this introduces a further delay by processing that batch. By contrast, the real-time processing of events according to embodiments of the present invention, i.e. the query and evaluation of rule conformities in response to receiving an event, allows for automatically updating the history relating to a state of an item or a related group of items having hierarchical links. Such updating is neither dependent on any time windows (periods) for collecting events nor is it dependent on any down times during which a further delay is introduced while the batch is actually processed. Rather, processing can occur each time an event is received and such processing is also advantageously limited to the relevant part of data, i.e. the state of the particular item or the related group of items, depending on the content of the particular event. As a further consequence, any unnecessary processing of additional parts of a batch can be avoided.

Figure 6C:
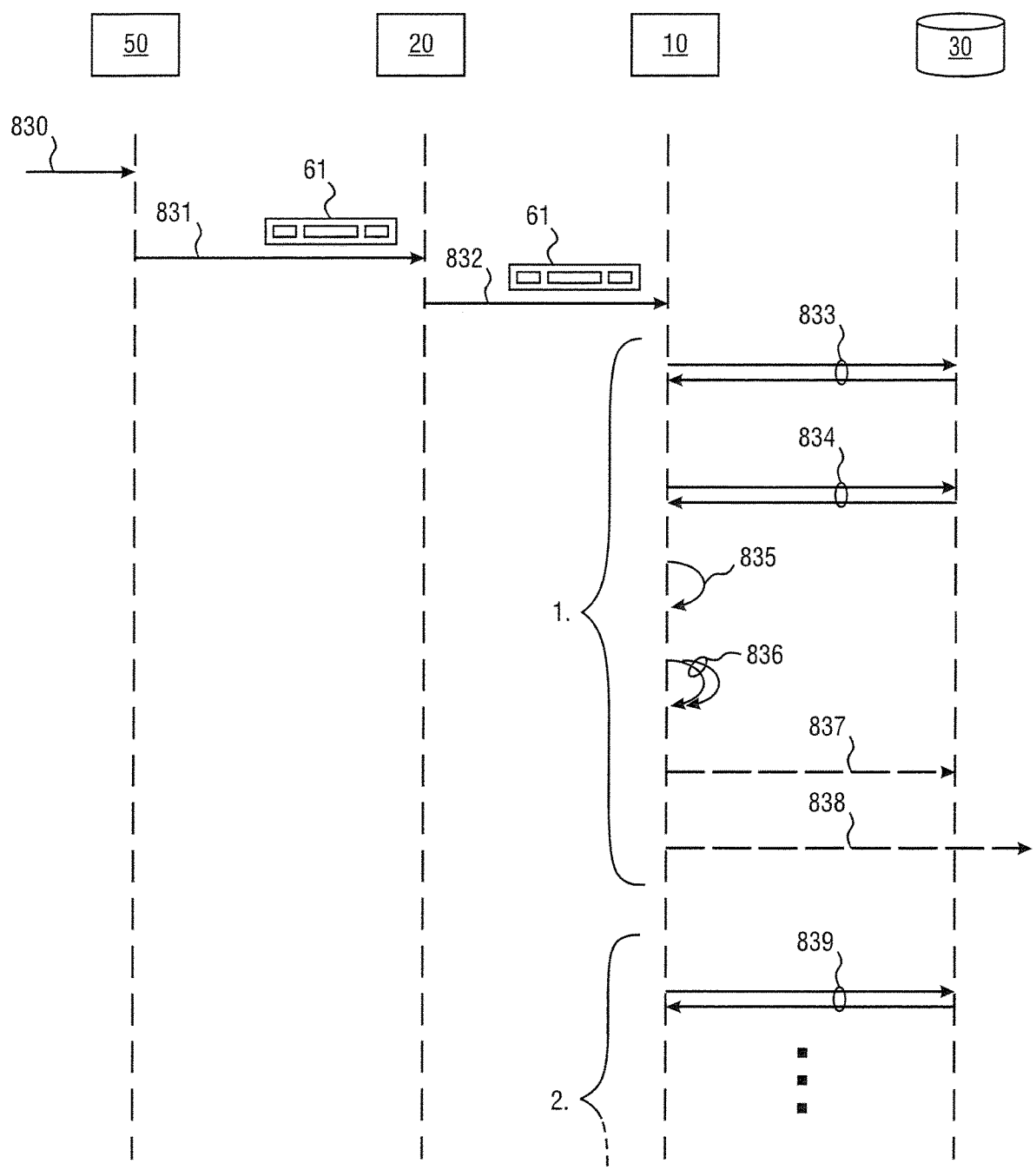

FIG. 6C shows a schematic processing diagram for processing another event scenario in a system according to the embodiments of the present invention. It is again referred to the acquisition equipment 50, the interface 20, the processing entity 10, and the data store 30. The shown procedure starts with an operation being applied to an item, a plurality of items, or a collection of items that, in turn, represent some superordinate item (bundle). This operation is reported by means of an event 830 to a corresponding piece of acquisition equipment 50. This recipient piece of acquisition equipment 50 then generates an event data record 61 which is forwarded in 831 to the interface 20. From this, the procedure proceeds similarly to that shown in conjunction with FIG. 6A. Namely, the event data record 61 is forwarded in 832 to the processing unit 10.

However, the received event data record 61 carries identification information that identifies more than one item. Namely, the corresponding identification information identifies items 1, 2, . . . by means of identifiers ID1, ID2, . . .

as they have been shown, for example, in conjunction with FIG. 3B. In this case the processing unit 10 parses the identification information comprised in the received event data record 61 so as to carry out all further action for each item identified. Namely, for one first item (1.) the preceding and succeeding states are queried, the new state information is generated, the applicable transitions are evaluated in 833, 834, 835, and 836. Optionally, the generated state information for that first item is stored in 837 to the data store 30, and any notifications 838 are effected in response to the evaluated rule conformities. Similarly, the procedures are repeated for the second item 2. In 839 onwards, and, again, for each further item identified by the identification information in the received event data record 61.

Although the above mentioned embodiments relate to application of the invention to tracing of items (like goods in distribution or vehicles in fleet management, for example), the specific method of handling event data records for evaluating state transitions (involving preceding and succeeding states) with respect to some rule conformity can also apply, by direct analogy, to other field such as the automation field (i.e. automatic control systems for operating machinery or industrial processes in factories), either of feedback control type or sequential control type. In this case, a controller (a PLC, Programmable Logic Controller, for example) typically controls the states of a device (instead of an "item") by receiving signals delivered by sensors measuring physical parameters relating to this device (instead of "operation on the item"). The controller can deliver events to a computer operable to run complex control algorithms to manage the device (or a plurality of devices), wherein an event here includes data indicating identification information of a device, a value of a parameter relating to the device as measured by a sensor and sent to the controller, and a time when the value of the parameter is delivered by the controller. Thus, the invention also allows a real-time control of automation events.

One such embodiment may be defined as a system for handling events in automation comprising: an interface configured to receive an event data record including event information indicating an event, time information indicating a time, and identification information identifying an originator; a data store configured to store state information indicating one or more states for each originator; and a processing unit configured to receive via the interface one event data record, and to, in response to receiving the event data record and for the at least one originator identified by the identification information included in the received event data record: generate, based on the received event data record, state information indicating a state of the originator after the event; query, from the data store, preceding state information indicating a state of the originator directly before the event, and succeeding state information indicating a state of the originator directly after the event; evaluate, if preceding state information was retrieved in response to querying the data store, a transition between the state indicated by the generated state information and the state indicated by the preceding state information for a first rule conformity, and to, evaluate, if succeeding state information was retrieved in response to querying the data store, a transition between the state indicated by the generated state information and the state indicated by the succeeding state information for a second rule conformity.

In such a system the time information may preferably indicate a time when event occurred and the identification information may preferably indicate an originator of the event, wherein an originator can be a sensor as part of distributed data acquisition equipment, or an item subject to manufacturing. In this way, the event may thus also represent sensor data as such.

In general, these further embodiments thus relate to systems and methods for handling events in automation, and, more specifically, to systems and methods handling event data records that include identification information identifying an originator, event information indicating an event, and time information indicating a time. Automation as such is nowadays common practice in various industrial fields, such as the manufacturing, packaging, and distribution of goods, laboratory and process equipment, logistics, transportation infrastructure, and the like. Common to such (industrial) automation is that usually distributed data acquisition equipment collects all sorts of data and detects the occurrence of events. For example, physical observables are measured as part of a manufacturing process or the presence of an item is detected at a specific processing stage. Such automation is already well supported by various conventional technical systems involving barcode readers, scanners, mobile terminals, network and communication equipment, sensors, detectors, satellite positioning systems, RF-ID equipment, servers, processing entities, data stores, and the like.

On a common scale, however, these systems employing all kinds of individual pieces of technical equipment as mentioned above, are usually distributed over the field, i.e. the area that the system is to cover. More specifically, at a manufacturing site there may be installed a plurality of sensors and scanners at various locations, personnel may be provided with hand-held devices for registering receipt and delivery of individual or bundled items or measuring observables, communication equipment may receive and forward corresponding data from the sensors, scanners, devices, etc. to some central entity that processes, stores, and evaluates the data. Commonly, also mobile equipment is used, for example when items or goods are transported between sites. However, also during such "trips" surveillance is continued, for example, in cases when the items may not exceed a given temperature during moving them between sites and processing stages.

In a way, such systems of all kinds of distributed technical equipment then may allow for supervising and controlling the process as a whole and for tracing one or more items in the field. In particular, the systems may allow for retrieving information on where one particular item is currently located, in what state (observable) a manufacturing or processing stage is, what happened when to a particular item, and what is the resulting state of the item as a result of some kind of operation, e.g. as the result of a manufacturing or processing stage.

There are various examples for operations that can apply to items in the field, however common to all operations is that a particular operation puts one item into a particular, well-defined state. For example, an item can be traced to be at a specific location (GPS coordinates, town, country, etc.), traced to have been subject to one or more operation(s) (e.g. processed, complemented by one or more components, machined, etc.) that, in turn, result in specific states of the items. Further the stages as such may be in various states according to the observable (e.g. all ok, failure, over temperature, low supply, etc.). Thus, these systems may be of particular use for optimizing manufacturing, distribution, service, maintenance and processes as such.

Although the usually large-scale distribution of such systems allows for a large coverage area and, consequently, allows for handling many sensors, stages, and items over a large geographical zone including many kinds of operations to the items, any distribution of systems usually suffers from difficulties as regards the collection and forwarding of information so as to enable accurate data acquisition. Specifically, any information collected in the field may be initially off-line, in the sense that a scanner or hand-held device collects data, but processes or forwards the collected data only with some delay, e.g. after some pre-determined number of events have been recorded.

For example, a sensor in a manufacturing site may be directly connected to the data collection entity and thus allows for real-time "live" data transmission, whereas sensors in transport equipment may sense an observable (e.g. temperature during transport) but can report the data only intermittedly or at the end of the transport where the sensor may regain access to a communication network. During the "off-line" periods the employed data acquisition equipment may thus buffer information for later reporting.

This can be the result of how the involved communication equipment works, since for each communication task a connection may need to be established which, in turn, causes power (battery) resources to be consumed or simply may require access to a communication network, which may not be accessible underground or inside of buildings. For example, the system may know that one item left a first site and that later in time this very item was seen at a second site. The information on what occurred in the meantime (e.g. was the temperature during transport kept in an admissible range) may still be buffered by some equipment and is yet to be reported, for example, at a next batch transfer at midnight or when a hand-held or mobile device again has access to a (wireless) communication network or is again put into its cradle. Naturally, also cost may play a role, as network operators may charge per connection, so that data is collected and retained deliberately.

Generally, the further embodiments can thus address the problem that the events of scanning, detecting, or measuring an observable, can suffer from delays when reported to some central data store or processing entity. As such, these delays may substantially degrade the accuracy of the systems so that the system may not be able to provide accurate information on the process with various possible disadvantageous consequences, such as lowering efficiency of the involved processes, causing an unnecessary consumption of energy resources, or—amongst others—triggering of false alerts.

In this way, a system, for example the one described in conjunction with FIG. 1, can be adapted for handling events in automation. The purpose of an employed network is the generally to convey event data records from acquisition equipment to the interface. The acquisition equipment may as such comprise various individual devices and entities, such as scanners, barcode readers, sensors, and the like. Generally, such acquisition equipment is adapted to measure an observable, detect a presence or a state and/or detect an operation on one or more items which will be described in greater detail below.

The system's processing unit in turn comprises or employs processing resources, memory resources, and communication resources. Said memory resources (e.g. memory) can store code so as to instruct the processing resources to perform receiving one event data record, and, in response to receiving the event data record, generating state information based on the received event data record. The state information indicates a state of the originator after the event identified by means of the received event data record.

In these embodiments, the state information can preferably indicate a state by means of suitable information: for example, the state information may indicate the state as a clear-text message or an identifier defined elsewhere in the system. A clear-text message can contain a string of characters indicating the state in well understandable fashion, e.g. "OK", "FAILURE", "OVER TEMPERATURE", etc. Likewise, such states may be defined by an identifier that relates to a more detailed definition in a list (code book) defined elsewhere, e.g. the state information may indicate a numerical or alphanumerical value (e.g. "245" or "HCY46F"), that, in turn, point to a more detailed definition in the code book, such as "245=OUT OF SUPPLY xxx". In this context, the event as such can be identified as the instance that or when some specific event has occurred. For example, the originator has detected that a temperature has exceeded a given threshold value or that a supply of a consumable (e.g. glue, lacquer, compounds, etc.) runs out. The event is then the instance of detecting corresponding state of the originator, i.e. the originator is then also in a state "FAILURE" or "OUT OF SUPPLY". In this way, the event and the state are closely related to each other and may be defined and/or stored in a similar or even identical fashion.

Further, the state information may also indicate a value of an observable. This specifically relates to the cases where an event as such can be identified in measuring an observable. The event is then also coupled to the time of the event, in the sense that the time information of the event data record can indicate the time when the measurement was taken or when an observable value is valid. For example, the originator may be a sensor measuring a physical observable (e.g. temperature, pressure, mass, volume, etc.) of a processing stage, tool, item, etc. Measuring this physical figure and obtaining a corresponding value at a given time may then identify the event. In this case, the event information of the event data record can carry information on the value of the observable and the time information indicates a time when that measurement was taken or when the value was valid.

Generally, the originator can be any identifiable and distinguishable entity. In practice, the originator is the entity that detects, generates or experiences the event. Following the above examples, an originator can be in form of a sensor (e.g. as part of distributed data acquisition equipment), a detector, a scanner, a processing or manufacturing stage, an item, and the like. It is to be noted, however, that the originator plays the role of correlating associated events, and resulting event data records, taking place at different points in time. For example, if a prior event relates to "OUT OF SUPPLY" or "OVER TEMPERATURE", a later event may relate to "SUPPLY REFILLED" or "TEMPERATURE OK". However, it may also be necessary to attribute the two consecutive events to the same originator in order to allow for a reliable assessment of the events and to allow proper and reliable operation of the system. For example, the mere assumption that a failure state has been cleared by receiving a positive event data record may not account for the possibility that the positive event data record relates to one originator, while it was another originator which generated the prior negative event data record.

Furthermore, the state information can store the values of one or more attributes of the originator. In particular, a list of suitable attributes values can be stored in the state information. The list may also include the definition or identifiers (names) of the attributes as such. Generally, an attribute can be any property associable to the originator, including physical observables, locations, field states, etc.

In response to receiving the event data record, the processing unit can now query from the data store preceding state information and succeeding state information, wherein the preceding state information here indicates a state of the originator directly before the event, and the succeeding state information indicates a state of the originator directly after the event. In this way, the data store can store states of an originator that "surround" the newly generated state, generated in response to the just received event data record.

Again, there can be of course situations in which no preceding state information exists. This may be the case if the received event (event data record) relates to an initializing procedure. For example, an originator may register with the system by simply transmitting a specific event and providing its identification. In this way, for example the setup, maintenance and configuration of distributed data acquisition equipment can be substantially facilitated. The event relating to such an initializing operation may thus be the first one with which consideration by the system begins and the originator is correspondingly "registered" with the system.

Likewise, there will be of course situations in which no succeeding state information exists. This will usually be the case when the system is up to date, i.e. stores the true and actual recent state. However, it can be of substantial advantage, that both a preceding state and a succeeding state are considered in any case, and thus (at least) are queried from the data store 30, regardless of whether they actually exist or not. The reason is that the received event data record may be delayed in the system although it relates to an event that occurred prior to an event already considered by storing the so-called succeeding state information.

Following examples and embodiments relating to the state information carrying information of an observable, one illustrative case may be that of a processing stage requiring temperatures below −18° C. for proper operation. So, preceding state information may define a state of, say, "−20° C.", indicating that the stage is operating correctly. Likewise, succeeding state information may define a state of "−24° C.", still indicating proper operation and also a cool down. A rule may now define allowable pairs reflecting some given requirement. For example, the requirement may be that the temperature should not vary by more than two degrees centigrade, for example, due to stability and continuity of the underlying process. In a way, this transition may thus be found not to conform to the applicable rule so that optionally a notification or even an alert is raise. However, if the incoming event defines a state of "−22° C.", both transitions, i.e. "−20° C."→"−22° C." and "−22° C."→"−24° C." may be found to conform to the rule.

An exemplary piece of acquisition equipment can be in the form of a handheld temperature scanner device. Such a device usually comprises a window through which a temperature of a target can be acquired. The device further comprises integrated processing equipment, usually including a processing unit, a memory unit, and possibly also a communication unit. Besides one or more (optional) operation buttons, device may also comprise a user interface in the form of a display (and/or light indicators, and the like). In this way, such a device can act as an originator in the sense of a portable sensor by measuring an observable (temperature) for some well-defined item, and/or at some well-defined location and at a given time. The device would then generate an event data record carrying as event information a value indicating the measured figure and as identification information an identifier of the device as originator or of the item as originator. Furthermore, such device is of course not limited to measure a temperature and any suitable figure may be subject to measurement and corresponding event generation.

A further exemplary piece of acquisition equipment can be in the form of a process temperature sensor device which usually comprises a detector area through which a temperature of a surrounding medium (e.g. liquid, process fluids, gases, granulates, etc.) can be acquired. Such a device further comprises integrated processing equipment, usually including a processing unit, a memory unit, and possibly also a communication unit. Such devices can be wire-bound, but this type of communication means can be of course complemented or substituted by a wireless interface, such as IrDA, Bluetooth™, ZigBee™, WLAN, UMTS, GPRS, GSM, 3GPP, LTE, and related technologies.

In the described devices of the further embodiments, the corresponding processing resources can be configured to determine the occurrence of an event and to compile correspondingly an event data record for immediate or later forwarding to the system's interface. In any way, the acquired information (identification of an item, presence of item, measuring temperature or other physical figure, etc.) is the basis for the event and the corresponding event data record being generated. As identification information any suitable identifier can be employed that can serve as more or less uniquely identify the originator.

The following numbered paragraphs define further embodiments of a general method embodiment of the present invention.

1. The method embodiment, wherein the method further comprises a step of evaluating, if the preceding state and the succeeding state information were retrieved in response to the query, a transition between the state indicated by the preceding state information and the state indicated by the succeeding state information for a third rule conformity.

2. The method embodiment or the method of paragraph 1, wherein the identification information identifies a plurality of items, and the method further performs the steps of generating the state information, of querying preceding state information and succeeding state information, and of evaluating, if preceding and/or succeeding state information was retrieved, the transitions, for each item of said plurality of items identified by the identification information.

3. The method embodiment or the method of paragraph 1 or 2, wherein the identification information identifies at least one further item, the at least one further item being associated to the one item, the method further comprising the steps of: generating, based on the received event data record, second state information indicating a state of the further item after the operation; querying second preceding state information indicating a state of the further item directly before the operation, and second succeeding state information indicating a state of the further item directly after the operation; evaluating, if second preceding state information was retrieved in response to the query, a transition between the state indicated by the second generated state information and the state indicated by the second preceding state information for a fourth rule conformity, and of, evaluating, if second succeeding state information was retrieved in response to the query, a transition between the state indicated by the second generated state information and the state indicated by the second succeeding state information for a fifth rule conformity.

4. The method embodiment or the method of any one of paragraphs 1 to 3, further comprising a step of querying to identify a related item that is associated to one of the items identified by the identification information included in the received event data record.

5. The method of paragraph 4, wherein the step of generating said state information indicating the state of the item after the operation is further based on queried state information indicating a state of the related item.

6. The method of paragraph 4 or 5, further comprising the steps of: generating, based on the received event data record, third state information indicating a state of the related item after the operation; querying third preceding state information indicating a state of the related item directly before the operation, and third succeeding state information indicating a state of the related item directly after the operation; evaluating, if third preceding state information was retrieved in response to the query, a transition between the state indicated by the third generated state information and the state indicated by the third preceding state information for a sixth rule conformity, and of, evaluating, if third succeeding state information was retrieved in response to the query, a transition between the state indicated by the third generated state information and the state indicated by the third succeeding state information for a seventh rule conformity.

7. The method embodiment or the method of any one of paragraphs 1 to 6, further comprising a step of issuing a notification based on an evaluated state transition.

8. The method of paragraph 7, wherein the notification comprises information on a relationship between items that are identified by said identification information.

9. The method of paragraph 7 or 8, wherein the notification is an alert indicating a non-conformity to a rule.

10. The method of any one of paragraphs 7 to 9, further comprising a step of cancelling and/or correcting an alert notification based on an evaluated state transition.

11. The method embodiment or the method of any one of paragraphs 1 to 10, wherein the rules are defined by value pairs relating to a state transition.

12. The method of paragraph 11, wherein the rules further consider the operation defined by the operation information of the event data record.

13. The method embodiment or the method of any one of paragraphs 1 to 12, wherein the event data record includes location information indicating a location where the operation took place.

14. The method embodiment or the method of any one of paragraphs 1 to 13, wherein the state information includes any one of a clear text, a reference to a code book, values of one or more attributes, identifiers for one or more attributes.

Although detailed embodiments have been described, these only serve to provide a better understanding of the invention defined by the independent claims, and are not to be seen as limiting.

The invention claimed is:

1. A system for tracing a plurality of items comprising:
an acquisition equipment adapted to detect operations applied to at least one item, and generate event data records each including operation information indicating an operation applied to the at least one item, time information indicating a time when the operation applied to the at least one item actually occurred, and identification information identifying the at least one item as detected by the acquisition equipment;
an interface configured to receive through a communication network the event data records from the acquisition equipment;
a data store configured to store state information indicating one or more states for each one of the plurality of items; and
a processing unit configured to receive via the interface the event data records from the acquisition equipment, and to, in response to currently receiving one event data record of the event data records from the acquisition equipment and for the at least one item identified by the identification information included in the currently received event data record:
generate, based on the currently received event data record, state information indicating a state of the at least one item as a result of an operation indicated in the currently received event data record;
query, from the data store, preceding state information indicating a state of the at least one item directly before the operation indicated in the currently received event data record, and succeeding state information indicating a state of the at least one item directly after the operation indicated in the currently received event data record,
wherein the preceding state information stored in the data store is state information generated and sent to the data store by the processing unit before generating the state information based on the currently received event data record, wherein the preceding state information is based on a previous event data record of the event data records from the acquisition equipment, the previous event data record was received by the processing unit before receiving the currently received event data record, and wherein the preceding state information indicates a state of the at least one item, which is earlier in time than the state indicated in the state information generated based on the currently received event data record;
and wherein the succeeding state information stored in the data store is state information generated and sent to the data store by the processing unit before generating the state information based on the currently received event data record, wherein the succeeding state information is based on another previous event data record of the event data records from the acquisition equipment, the other previous event data record was received by the processing unit before receiving the currently received event data record, and wherein the succeeding state information indicates a state of the at least one item, which is later in time than the state indicated in the state information generated based on the currently received event data record;
evaluate, if the preceding state information was retrieved in response to querying the data store, a transition between the state indicated by the generated state information and the state indicated by the preceding state information for a first rule conformity, and to,
evaluate, if the succeeding state information was retrieved in response to querying the data store, a transition between the state indicated by the generated state information and the state indicated by the succeeding state information for a second rule conformity,
wherein the processing unit is configured to, in response to a specific result from evaluating rule conformity, issue a notification, and the system further comprises
a control unit configured to, upon reception of the notification, automatically activate an operation on the item at manufacturing, processing or distribution stage.

2. The system of claim 1, wherein the processing unit is further configured, to evaluate, if the preceding state and the succeeding state information were retrieved in response to the querying the data store, a transition between the state indicated by the preceding state information and the state indicated by the succeeding state information for a third rule conformity.

3. The system of claim 1, wherein the identification information identifies a plurality of items, and the processing unit is configured to generate the state information, to query preceding state information and succeeding state information, and to evaluate, if preceding and/or succeeding state information was retrieved, the transitions, for each item of said plurality of items identified by the identification information.

4. The system of claim 1, wherein the identification information identifies at least one further item, the at least one further item being associated to the one item, and the processing unit is further configured to:
 generate, based on the currently received event data record, second state information indicating a state of the further item as a result of the operation indicated in the currently received event data record;
 query, from the data store, second preceding state information indicating a state of the further item directly before the operation indicated in the currently received event data record, and second succeeding state information indicating a state of the further item directly after the operation indicated in the currently received event data record;
 evaluate, if the second preceding state information was retrieved in response to querying the data store, a transition between the state indicated by the second generated state information and the state indicated by the second preceding state information for a fourth rule conformity, and to,
 evaluate, if the second succeeding state information was retrieved in response to querying the data store, a transition between the state indicated by the second generated state information and the state indicated by the second succeeding state information for a fifth rule conformity.

5. The system of claim 1, wherein the processing unit is further configured to query the data store for identifying a related item that is associated to one of the items identified by the identification information included in the currently received event data record.

6. The system of claim 5, wherein the processing unit is further configured to generate said state information indicating the state of the item as a result of the operation indicated in the currently received event data record, further based on state information queried from the data store and indicating a state of the related item.

7. The system of claim 5, wherein the processing unit is further configured to:
 generate, based on the currently received event data record, third state information indicating a state of the related item as a result of the operation indicated in the currently received event data record;
 query, from the data store, third preceding state information indicating a state of the related item directly before the operation indicated in the currently received event data record, and third succeeding state information indicating a state of the related item directly after the operation indicated in the currently received event data record;
 evaluate, if the third preceding state information was retrieved in response to querying the data store, a transition between the state indicated by the third generated state information and the state indicated by the third preceding state information for a sixth rule conformity, and to
 evaluate, if the third succeeding state information was retrieved in response to querying the data store, a transition between the state indicated by the third generated state information and the state indicated by the third succeeding state information for a seventh rule conformity.

8. The system of claim 1, wherein the notification comprises information on a relationship between items that are identified by said identification information.

9. The system of claim 1, wherein the notification is an alert indicating a non-conformity to a rule.

10. The system of claim 1, wherein the processing unit is further configured to cancel and/or correct an alert notification based on an evaluated state transition.

11. The system of claim 1, wherein the first and second rules are defined by value pairs relating to a state transition.

12. The system of claim 11, wherein the first and second rules further consider the operation defined by the operation information of the event data record.

13. The system of claim 1, wherein the event data record includes location information indicating a location where the operation took place.

14. The system of claim 1, wherein the state information includes any one of a clear text, a reference to a code book, values of one or more attributes, identifiers for one or more attributes.

15. A method for tracing a plurality of items comprising the steps of:
 detecting via an acquisition equipment operations applied to at least one item, and generating event data records each including operation information indicating an operation applied to the at least one item, time information indicating a time when the operation applied to the at least one item actually occurred, and identification information identifying the at least one item as detected by the acquisition equipment;
 receiving, by an interface, via a communication network the event data records from the acquisition equipment;
 storing in a data store state information indicating one or more states for each one of the plurality of items; and
 in response to currently receiving via the interface one event data record of the event data records from the acquisition equipment and for the at least one item identified by the identification information included in the currently received event data record, performing by means of a processing unit the steps of:
 generating, based on the currently received event data record, state information indicating a state of the at least one item as a result of an operation indicated in the currently received event data record;
 querying, from the data store, preceding state information indicating a state of the at least one item directly before the operation indicated in the currently received event data record, and succeeding state information indicating a state of the at least one item directly after the operation indicated in the currently received event data record,
  wherein the preceding state information stored in the data store is state information generated and sent to the data store by the processing unit before generating the state information based on the currently received event data record, wherein the preceding state information is based on a previous event data record of the event data records from the acquisition equipment, the previous event data record was received by the processing unit before receiving the currently received event data record, and wherein the preceding state information indicates a state of the at least one item, which is earlier in time than the state indicated in the state information generated based on the currently received event data record;

and wherein the succeeding state information stored in the data store is state information generated and sent to the data store by the processing unit before generating the state information based on the currently received event data record, wherein the succeeding state information is based on another previous event data record of the event data records from the acquisition equipment, the other previous event data record was received by the processing unit before receiving the currently received event data record, and wherein the succeeding state information indicates a state of the at least one item, which is later in time than the state indicated in the state information generated based on the currently received event data record;

evaluating, if the preceding state information was retrieved in response to the query, a transition between the state indicated by the generated state information and the state indicated by the preceding state information for a first rule conformity, and of, evaluating, if the succeeding state information was retrieved in response to the query, a transition between the state indicated by the generated state information and the state indicated by the succeeding state information for a second rule conformity, and in response to a specific result from evaluating rule conformity, issuing a notification and automatically activating, via a control unit, an operation on the item at manufacturing, processing or distribution stage.

16. A computer program stored in a non-transitory computer-readable tangible medium, wherein the computer program comprises code, said code when executed on processing resources of a processing entity implementing a method for tracing a plurality of items comprising the steps of:

detecting via an acquisition equipment operations applied to at least one item, and generating event data records each including operation information indicating an operation applied to the at least one item, time information indicating a time when the operation applied to the at least one item actually occurred, and identification information identifying the at least one item as detected by the acquisition equipment;

receiving, by an interface, via a communication network the event data records from the acquisition equipment;

storing in a data store state information indicating one or more states for each one of the plurality of items; and in response to currently receiving via the interface one event data record of the event data records from the acquisition equipment and for the at least one item identified by the identification information included in the currently received event data record, performing by means of a processing unit the steps of:

generating, based on the currently received event data record, state information indicating a state of the at least one item as a result of an operation indicated in the currently received event data record;

querying, from the data store, preceding state information indicating a state of the at least one item directly before the operation indicated in the currently received event data record, and succeeding state information indicating a state of the at least one item directly after the operation indicated in the currently received event data record, wherein the preceding state information stored in the data store is state information generated and sent to the data store by the processing unit before generating the state information based on the currently received event data record, wherein the preceding state information is based on a previous event data record of the event data records from the acquisition equipment, the previous event data record was received by the processing unit before receiving the currently received event data record, and wherein the preceding state information indicates a state of the at least one item, which is earlier in time than the state indicated in the state information generated based on the currently received event data record;

and wherein the succeeding state information stored in the data store is state information generated and sent to the data store by the processing unit before generating the state information based on the currently received event data record, wherein the succeeding state information is based on another previous event data record of the event data records from the acquisition equipment, the other previous event data record was received by the processing unit before receiving the currently received event data record, and wherein the succeeding state information indicates a state of the at least one item, which is later in time than the state indicated in the state information generated based on the currently received event data record;

evaluating, if the preceding state information was retrieved in response to the query, a transition between the state indicated by the generated state information and the state indicated by the preceding state information for a first rule conformity, and of, evaluating, if the succeeding state information was retrieved in response to the query, a transition between the state indicated by the generated state information and the state indicated by the succeeding state information for a second rule conformity, and in response to a specific result from evaluating rule conformity, issuing a notification and automatically activating, via a control unit, an operation on the item at manufacturing, processing or distribution stage.

* * * * *